(12) United States Patent
Andrews

(10) Patent No.: US 10,906,140 B2
(45) Date of Patent: Feb. 2, 2021

(54) BEARING RACE INSTALLER/REMOVER

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 407 days.

(21) Appl. No.: 15/488,149

(22) Filed: Apr. 14, 2017

(65) Prior Publication Data

US 2017/0297152 A1 Oct. 19, 2017

Related U.S. Application Data

(60) Provisional application No. 62/323,076, filed on Apr. 15, 2016.

(51) Int. Cl.
| | |
|---|---|
| *B23P 15/00* | (2006.01) |
| *B25B 27/06* | (2006.01) |
| *F16C 19/54* | (2006.01) |
| *B60B 27/00* | (2006.01) |
| *B60B 27/02* | (2006.01) |

(52) U.S. Cl.
CPC .......... *B23P 15/003* (2013.01); *B25B 27/062* (2013.01); *B25B 27/064* (2013.01); *F16C 19/54* (2013.01); *B60B 27/00* (2013.01); *B60B 27/02* (2013.01); *B60B 2320/10* (2013.01); *B60B 2900/212* (2013.01); *F16C 2326/02* (2013.01)

(58) Field of Classification Search
CPC ..... B25B 27/06; B25B 27/062; B25B 27/023; Y10T 29/53878; Y10T 29/53887

USPC ............................ 29/255, 262, 263, 259, 261
See application file for complete search history.

(56) References Cited

U.S. PATENT DOCUMENTS 1,155,720 A * 10/1915 Golly ................... B25B 27/062
29/265
1,334,658 A 3/1920 Koch
(Continued)

FOREIGN PATENT DOCUMENTS

DE 20113561 U1 11/2001
EP 2461061 A2 6/2012
(Continued)

OTHER PUBLICATIONS

International Searching Authority, ISR & Written Opinion, PCT/US2018/049608, dated Dec. 6, 2018 8 pages.
(Continued)

*Primary Examiner* — Orlando E Aviles
*Assistant Examiner* — Seahee Hong
(74) *Attorney, Agent, or Firm* — Michael R. Schacht; Schacht Law Office, Inc.

(57) ABSTRACT

A puller/installer comprises a draw plate, a split ring, a cap plate, and at least one draw member. The draw plate defines a draw plate cam surface. The split ring defines at least one split plate cam surface and is arranged such that the at least one split plate cam surface is in contact with the draw plate cam surface. The at least one draw member is arranged to draw the cap plate and the draw plate towards each other such that the draw plate cam surface engages the at least one split plate cam surface to deform the split ring to alter an effective diameter of the bearing race puller/installer.

10 Claims, 20 Drawing Sheets

(56) References Cited

U.S. PATENT DOCUMENTS

| | | | | |
|---|---|---|---|---|
| 1,476,983 | A * | 12/1923 | King | B23D 21/145 |
| | | | | 29/262 |
| 1,990,570 | A * | 2/1935 | Smith | B25B 27/023 |
| | | | | 29/262 |
| 2,290,427 | A * | 7/1942 | Harrington | B25B 27/062 |
| | | | | 29/265 |
| 2,380,980 | A * | 8/1945 | Looney | B25B 27/062 |
| | | | | 29/263 |
| 2,755,540 | A | 7/1956 | Crozier | |
| 3,336,652 | A | 8/1967 | Andre | |
| 4,034,458 | A | 7/1977 | Ford et al. | |
| 4,589,180 | A * | 5/1986 | Vachon | B25B 9/00 |
| | | | | 29/263 |
| 4,769,890 | A | 9/1988 | Maynard | |
| 5,787,561 | A | 8/1998 | Harmand | |
| RE36,009 | E * | 12/1998 | Shultz | B25B 27/023 |
| | | | | 29/263 |
| 7,003,877 | B2 * | 2/2006 | Reale | B25B 27/062 |
| | | | | 29/259 |
| 7,707,709 | B2 | 5/2010 | Whitehead | |
| 10,265,839 | B1 * | 4/2019 | Hunter | B25B 27/06 |
| 2002/0095759 | A1 * | 7/2002 | Scott | B25B 9/00 |
| | | | | 29/263 |
| 2007/0251076 | A1 * | 11/2007 | Zhong | F16C 39/02 |
| | | | | 29/426.5 |
| 2009/0211094 | A1 * | 8/2009 | Adelman | F22B 37/02 |
| | | | | 29/890.031 |
| 2010/0281665 | A1 * | 11/2010 | Punaro | B25B 27/062 |
| | | | | 29/258 |
| 2017/0209994 | A1 | 7/2017 | Hargrove et al. | |
| 2017/0297152 | A1 | 10/2017 | Andrews | |
| 2017/0307020 | A1 | 10/2017 | Andrews | |
| 2019/0070716 | A1 | 3/2019 | Andrews | |

FOREIGN PATENT DOCUMENTS

| | | |
|---|---|---|
| JP | 104800 | 9/1974 |
| JP | 192877 | 12/1987 |
| JP | 4105881 A | 4/1992 |
| RU | 2028933 C1 | 2/1995 |
| SU | 1207744 A | 1/1986 |
| SU | 1632766 A1 | 3/1991 |
| WO | 2011012552 A1 | 2/2011 |
| WO | 2017181078 | 10/2017 |
| WO | 2019050989 A1 | 3/2019 |

OTHER PUBLICATIONS

International Searching Authority, ISR & Written Opinion, PCT/US2017/027724, dated Aug. 17, 2017 7 pages.

International Searching Authority, ISR & Written Opinion, PCT/US2015/057201, dated Dec. 22, 2015, 9 pages.

* cited by examiner

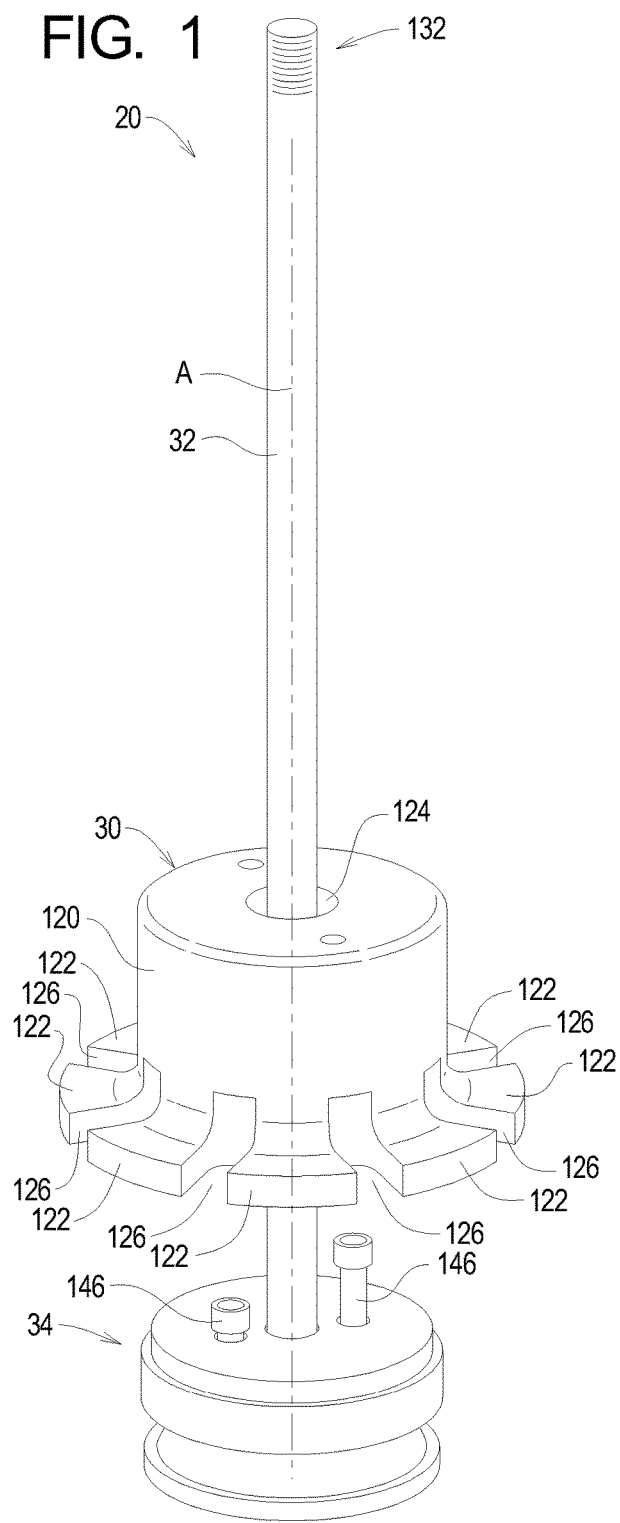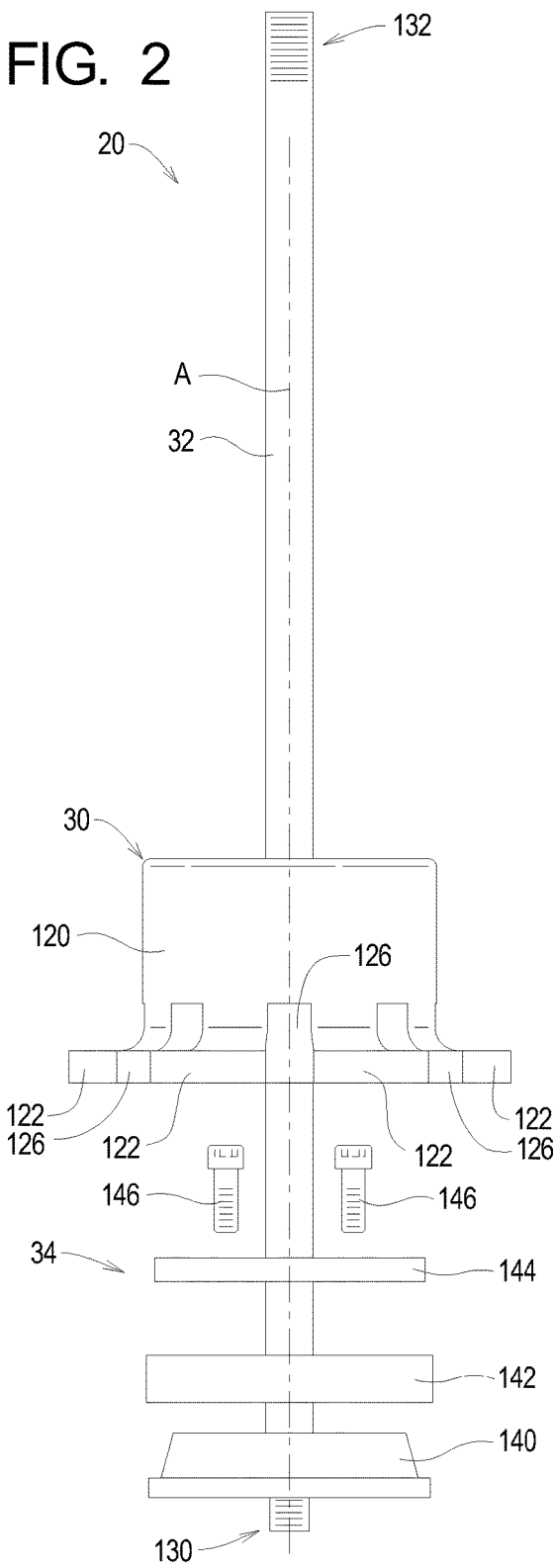

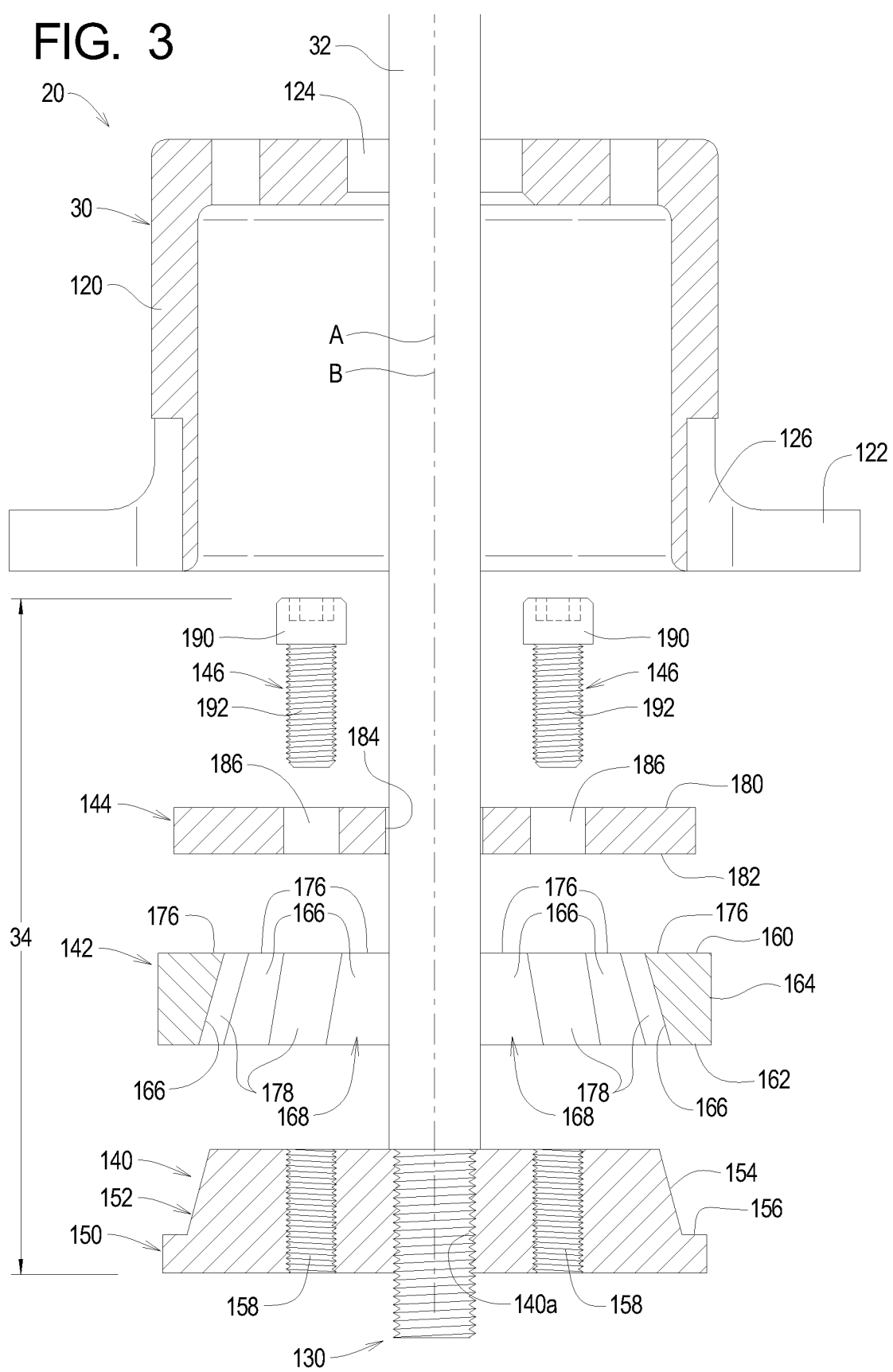

BEARING RACE INSTALLER/REMOVER

RELATED APPLICATIONS

This application, U.S. patent application Ser. No. 15/488,149 filed Apr. 14, 2017, claims benefit of U.S. Provisional Application Ser. No. 62/323,076 filed Apr. 15, 2016, the contents of which are incorporated herein by reference.

TECHNICAL FIELD

This disclosure relates to the field of tools for the insertion and/or removal of a bearing race, ring, bushing, or other device press-fit into a recess.

BACKGROUND

A first part may need to be connected to a second part to form a larger mechanical system. One method of connecting the first part to the second part is to use an interference fit (also referred to as a press fit or friction fit). To form an interference fit, the first and second parts are forced together such that friction inhibits removal of the two parts from each other. As one example, an interference or press fit is commonly used to secure a bearing race to a wheel. In particular, the wheel defines an annular bearing race recess and the bearing race housing is cylindrical. The bearing race is inserted into the bearing race recess such that friction between the bearing race and the wheel secures the bearing race housing relative to the wheel.

The present invention is of particular significance when used to insert a bearing race into and remove a bearing race from the bearing race recess defined by a wheel, and that example of the present invention will be described herein in detail.

The bearing race housing is typically sized and dimensioned relative to the bearing race recess such that the application of force on the bearing race housing is difficult, especially when removing the bearing race from the wheel. The wheel and/or the bearing race may easily be damaged when installing and removing the bearing race.

The need exists for improved bearing race installer/removers that minimize the likelihood of damage during insertion and/or removal of the bearing race from the wheel.

SUMMARY

The present invention may be embodied as a puller/installer comprising a draw plate, a split ring, a cap plate, and at least one draw member. The draw plate defines a draw plate cam surface. The split ring defines at least one split plate cam surface and is arranged such that the at least one split plate cam surface is in contact with the draw plate cam surface. The at least one draw member is arranged to draw the cap plate and the draw plate towards each other such that the draw plate cam surface engages the at least one split plate cam surface to deform the split ring to alter an effective diameter of the bearing race puller/installer.

The present invention may also be embodied as a tool assembly for installing a bearing race into and/or removing the bearing race from a wheel, the tool assembly comprising a draw plate, a split ring, a cap plate, and at least one draw member. The draw plate defines a draw plate cam surface. The split ring defines at least one split plate cam surface and is arranged such that the at least one split plate cam surface is in contact with the draw plate cam surface. The at least one draw member is arranged to draw the cap plate and the draw plate towards each other such that the draw plate cam surface engages the at least one split plate cam surface to deform the split ring to alter an effective diameter of the bearing race puller/installer. The split ring is sized and dimensioned to engage a portion of the bearing race when the split ring is deformed.

The present may also be embodied as a method of installing a bearing race into and/or removing the bearing race from a wheel comprising the following steps. A draw plate defining a draw plate cam surface is provided. A split ring defining at least one split plate cam surface is provided. The split ring is arranged such that the at least one split plate cam surface is in contact with the draw plate cam surface. A cap plate is provided. At least one draw member is arranged to draw the cap plate and the draw plate towards each other such that the draw plate cam surface engages the at least one split plate cam surface to deform the split ring to alter an effective diameter of the bearing race puller/installer such that the split ring engages a portion of the bearing race when the split ring is deformed.

BRIEF DESCRIPTION OF THE DRAWINGS

FIG. 1 is a perspective view of a first example bearing race installer/remover of the present invention;

FIG. 2 is a side elevation, partly exploded view of the first example bearing race remover/installer;

FIG. 3 is a side elevation, partly exploded view of a portion of the first example bearing race remover/installer;

DETAILED DESCRIPTION

Figure 23:
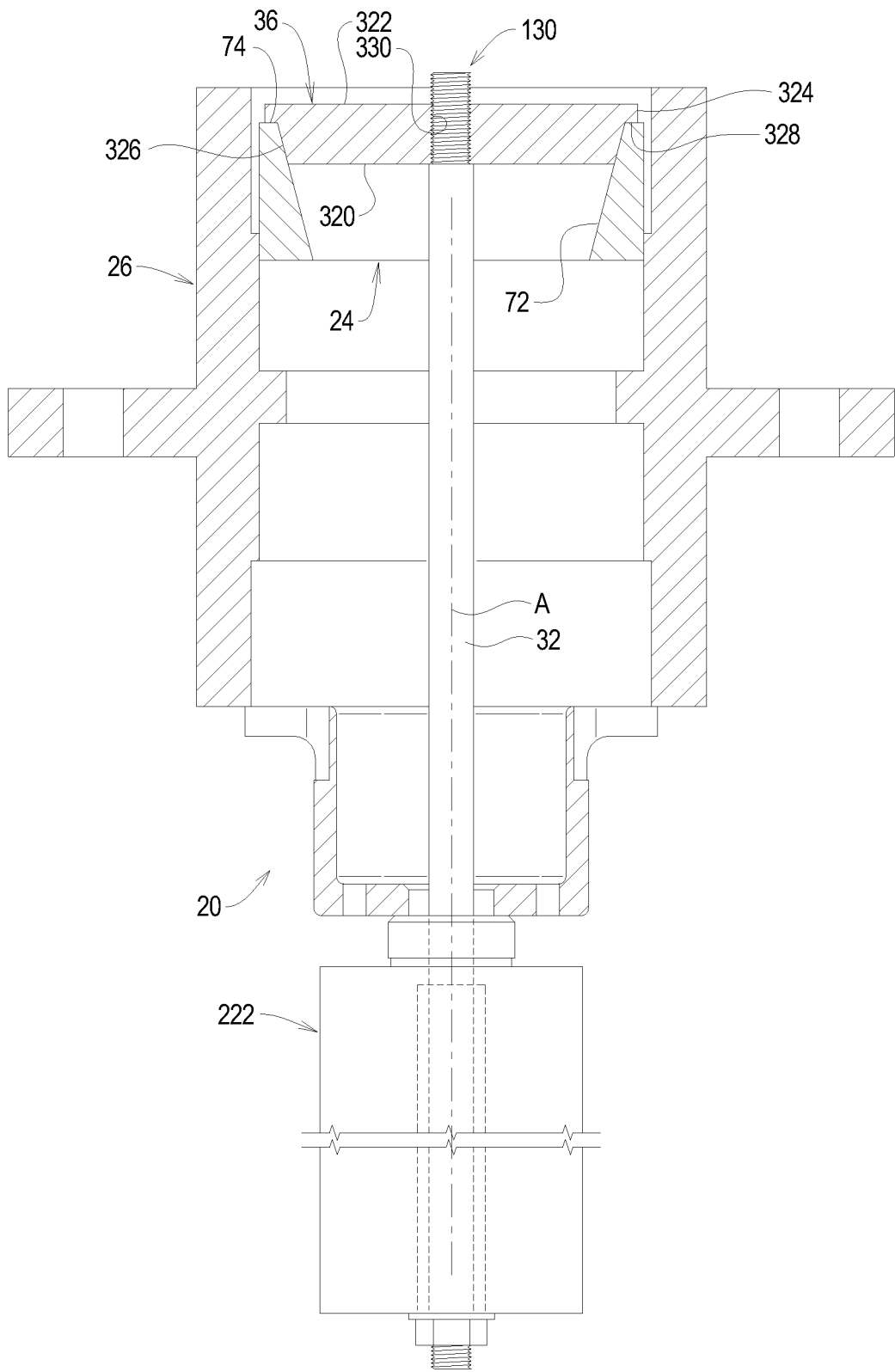
FIG. 23 is a section view showing an initial step of the process of using the first example bearing race remover/installer to install a bearing race.
Figure 24:
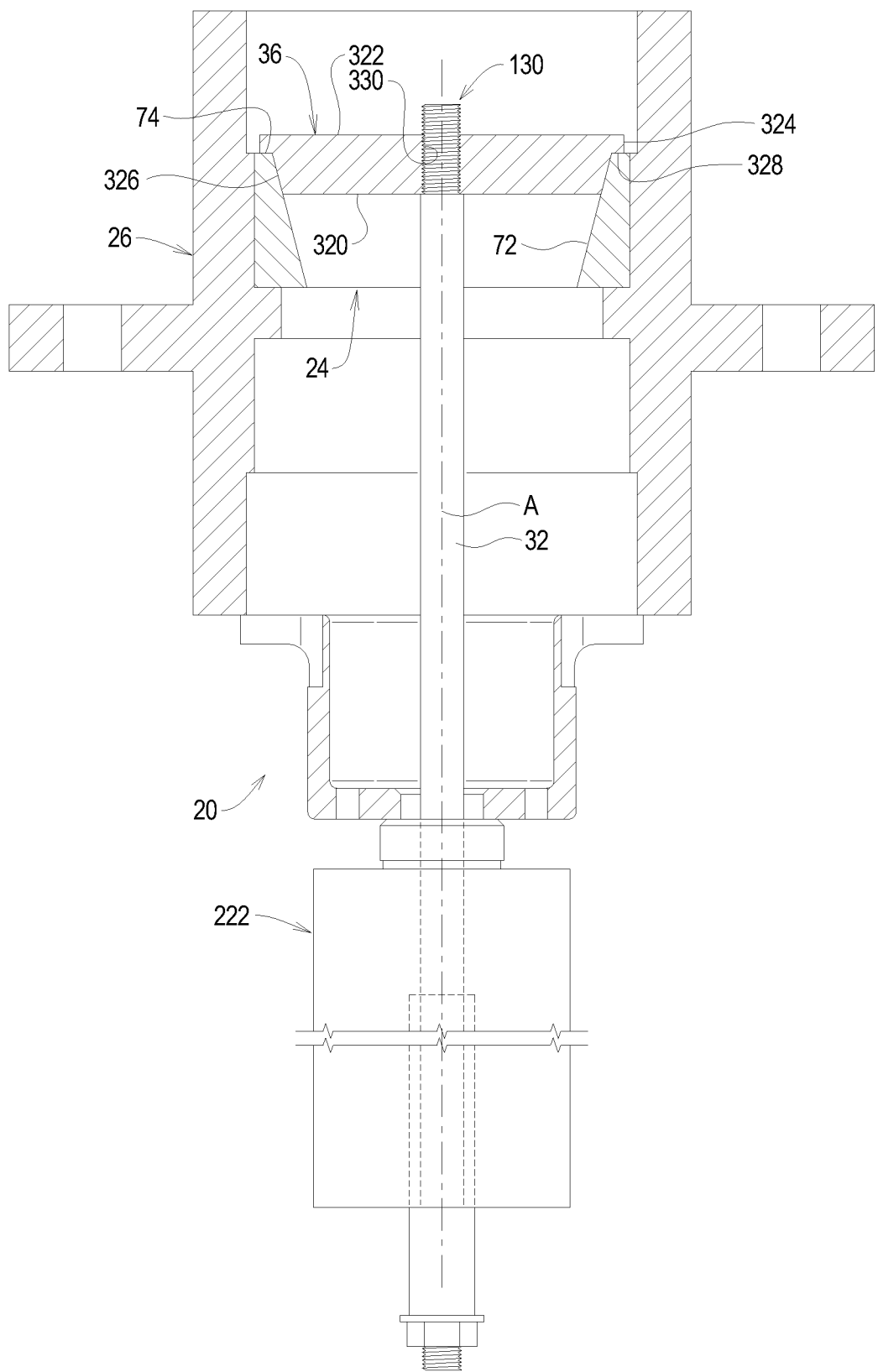
FIG. 24 is a section view showing the completion of the process of using the first example bearing race remover/installer to install a bearing race.

Referring initially to FIGS. 1-3 of the drawing, depicted therein is a first example bearing race installer/remover (bearing tool) 20 constructed in accordance with, and embodying, the principles of the present invention. As shown in FIGS. 4-9, the first example bearing tool 20 is used with a drive system 22 to remove a bearing race 24 from a wheel 26. FIGS. 1-3 illustrate that the first example bearing tool 20 comprises an anchor 30, a rod 32, and a grip assembly 34. FIGS. 23 and 24 show that the first example bearing tool 20 further comprises one or more insertion caps 36 sized and dimensioned to facilitate insertion of a bearing race such as the bearing race 24 into a wheel such as the wheel 26.

The drive system 22, bearing race 24, and wheel 26 are or may be conventional and will be described herein only to the extent necessary for a complete understanding of the present invention. FIGS. 4-9 illustrate the example wheel 26 defines an example hub 40 defining first, second, third, and fourth hub inner surfaces 42, 44, 46, and 48 and first, second, and third hub radial surfaces 50, 52, and 54. The example hub 40 further defines a hub main opening 60, a hub inner opening 62, and a bearing race recess 64. The example bearing race 24 defines a bearing race outer surface 70, a bearing race inner surface 72, a bearing race first end surface 74, and a bearing race second end surface 76. The example bearing race 24 further defines a bearing race opening 80 and first and second bearing race edges 82 and 84.

The bearing race 24 is press fit into the bearing race recess 64 during normal use of the wheel 26. When fully press fit into the bearing race recess 64, the bearing race first end surface 74 is aligned with the hub first radial surface 50 and the bearing race second end surface 76 is in contact with the bearing race second radial surface 52.

Figure 4:
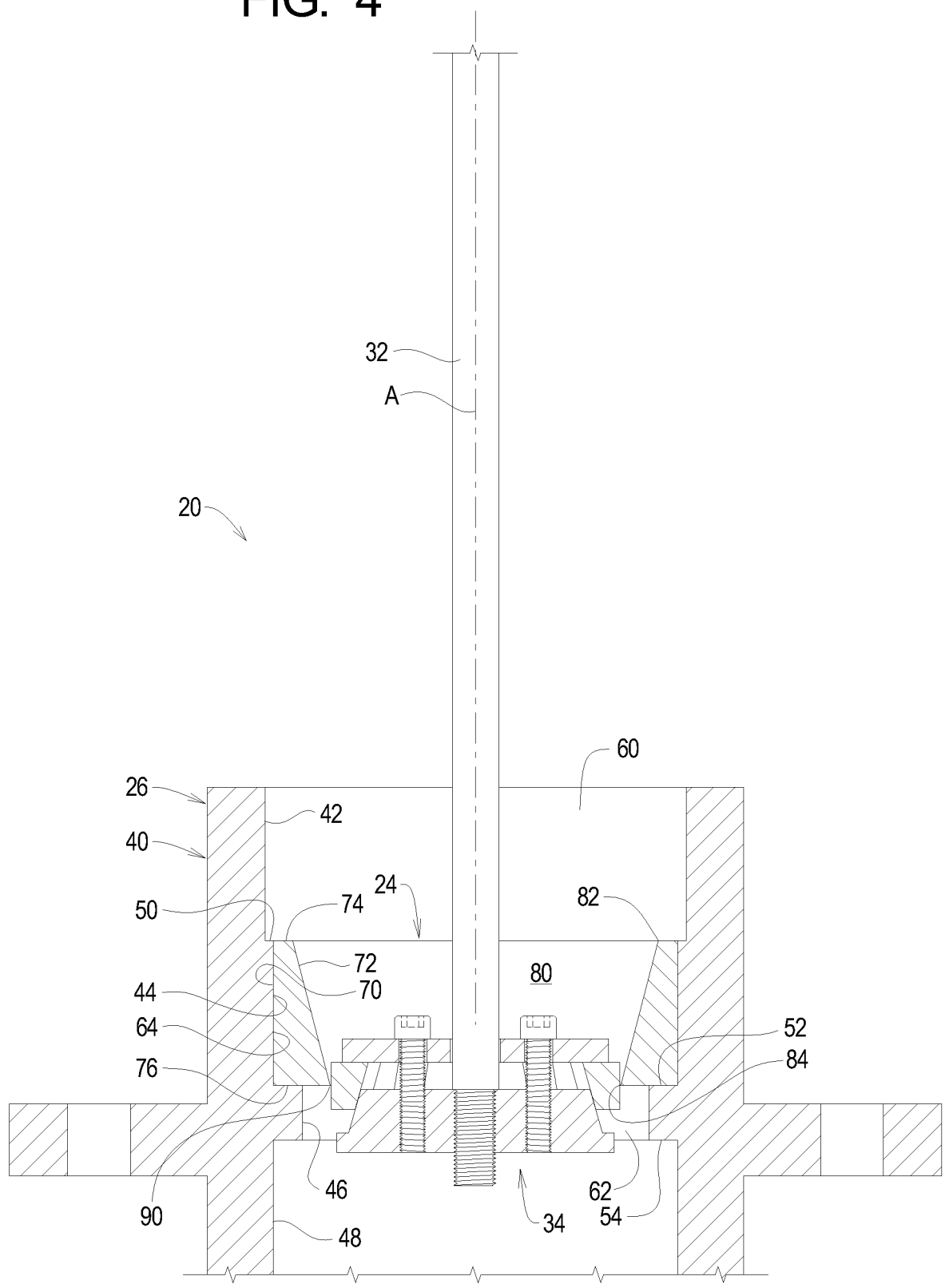
FIG. 4 is a side elevation, partial section view showing a first step of a method of using the first example bearing race remover/installer to remove a bearing race.
Figure 5:
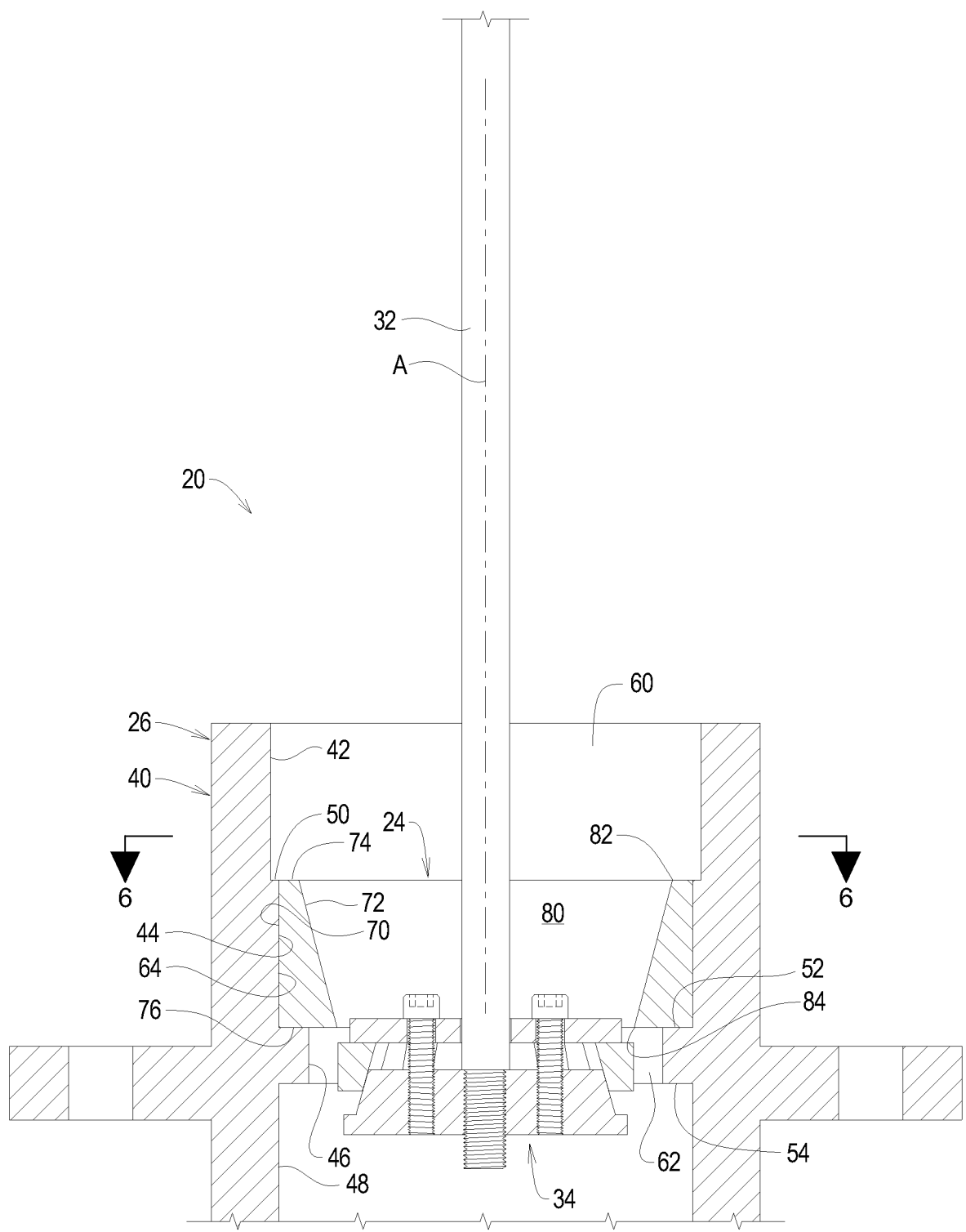
FIG. 5 is a side elevation, partial section view showing a second step of the method of using the first example bearing race remover/installer to remove a bearing race.
Figure 6:
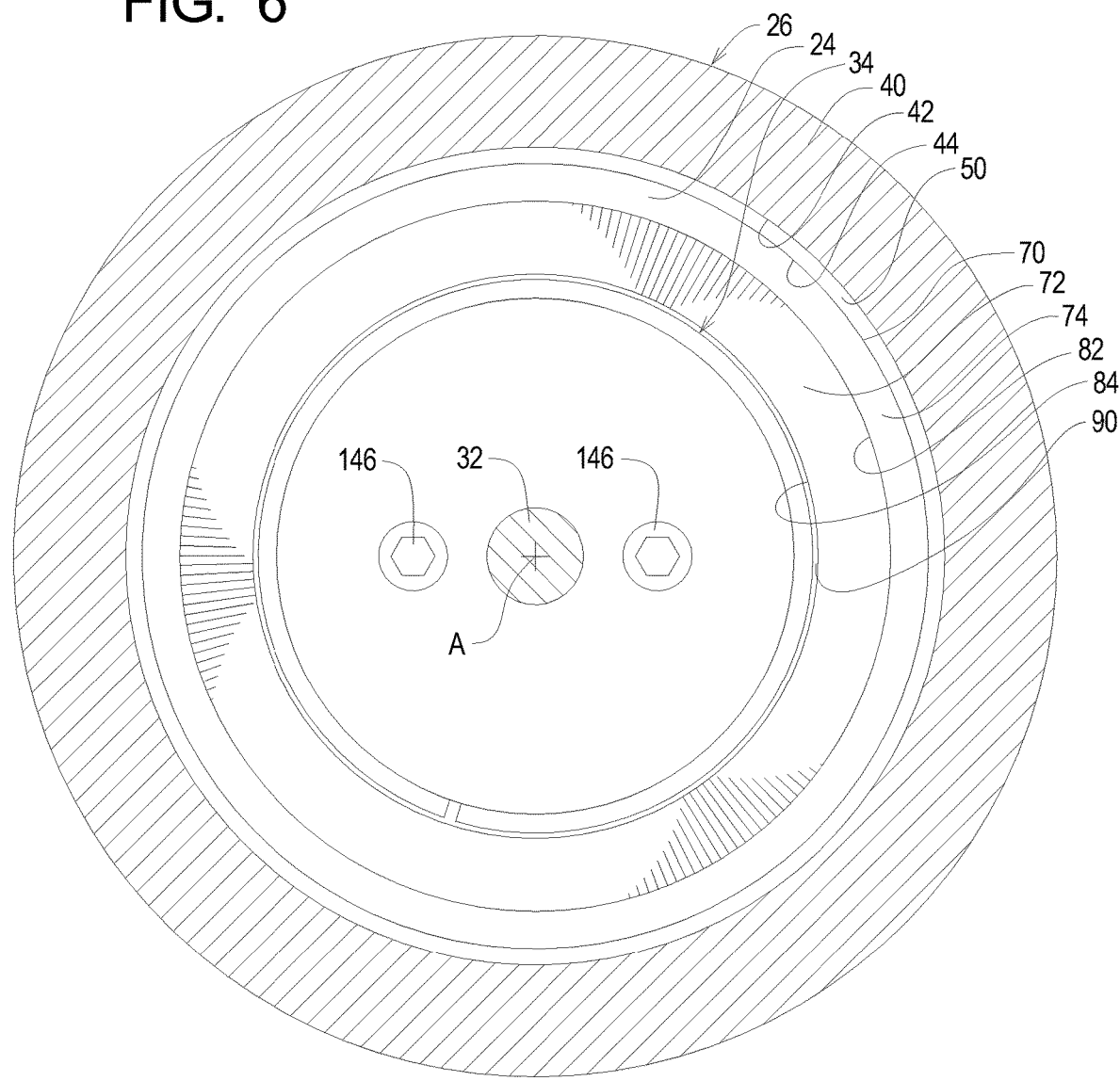
FIG. 6 is a top plan, partial section view showing the second step of the method of using the first example bearing race remover/installer to remove a bearing race.

To remove bearing race 24 from the hub 40, the grip assembly 34 in its retracted configuration is passed through the hub main opening 60, the hub inner opening 62, and the bearing race opening 80 as shown in FIG. 4. FIG. 6 illustrates that an effective diameter of the grip assembly 34 in the retracted configuration is less than a minimum diameter of the bearing race opening 80 as defined by the second bearing race edge 84 such that an annular gap 90 is arranged between the grip assembly 34 and the second bearing race edge 84. This annular gap 90 allows the grip assembly 34 in the retracted configuration to be passed through the bearing race opening 80 until at least a portion of the grip assembly 34 is beyond the second bearing race edge 84 as shown in FIG. 5. At this point, the rod extends from the grip assembly 34 through the hub main opening 60.

Figure 7:
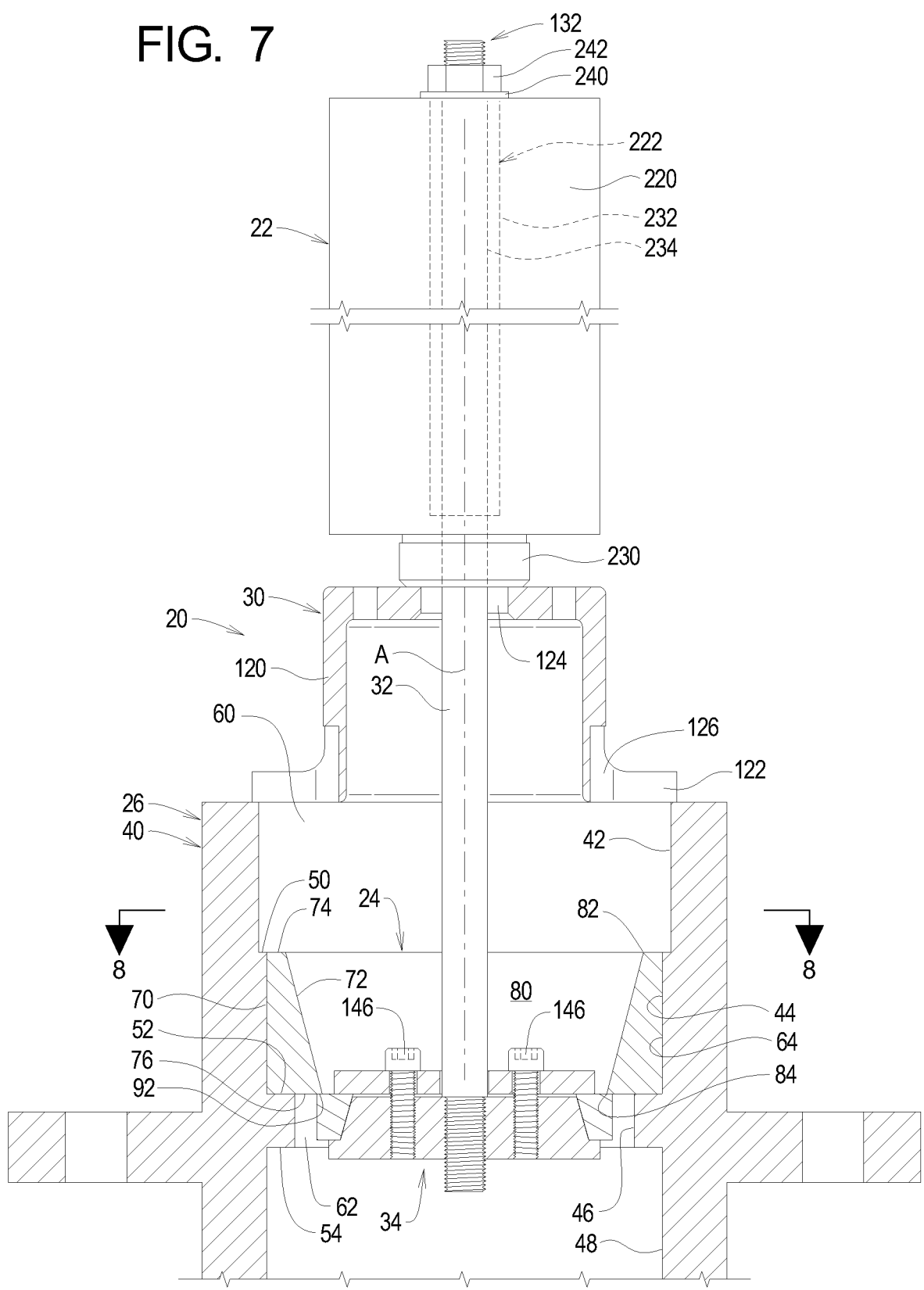
FIG. 7 is a side elevation, partial section view showing a third step of the method of using the first example bearing race remover/installer to remove a bearing race.
Figure 8:
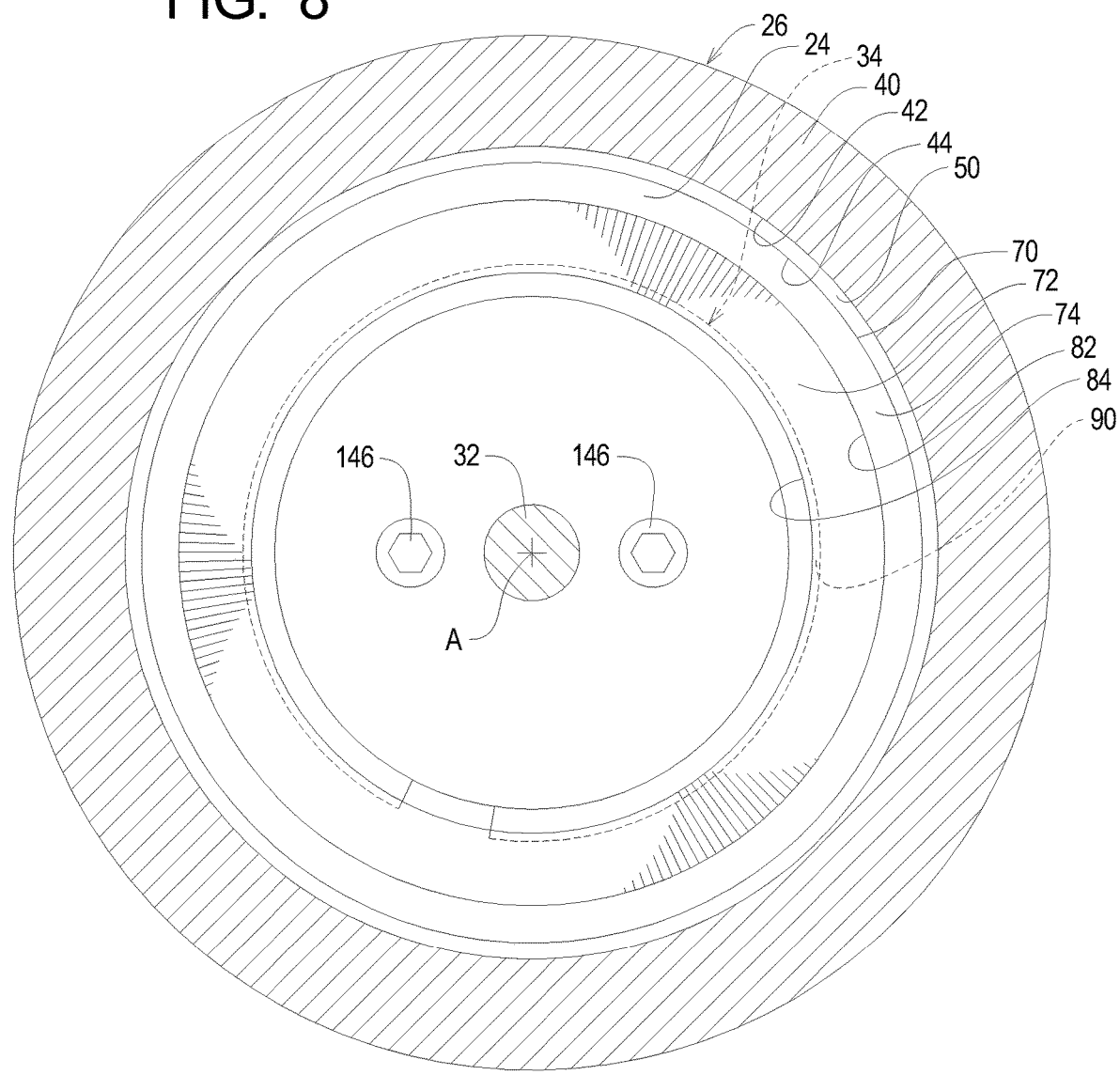
FIG. 8 is a top plan, partial section view showing the third step of the method of using the first example bearing race remover/installer to remove a bearing race.

As shown in FIGS. 7 and 8, the grip assembly 34 is next placed into an expanded configuration in which the effective diameter of the grip assembly 34 is larger than the minimum diameter of the bearing race opening 80 as defined by the second bearing race edge 84. At this point, the effective diameter of the grip assembly 34 effectively overlaps the bearing race second end surface 76 in an annular overlap region 92 illustrated in FIG. 8.

Figure 9:
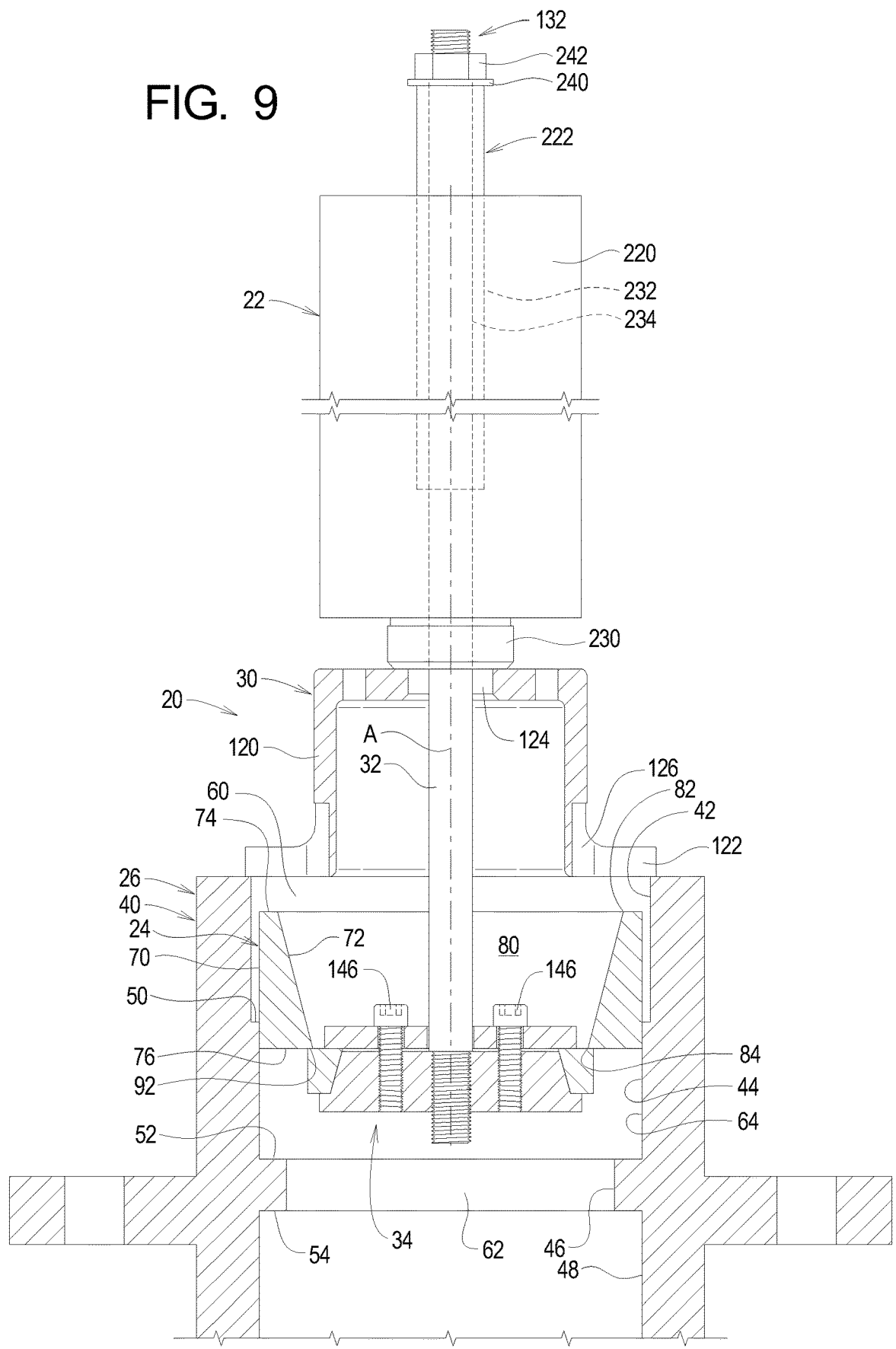
FIG. 9 is a side elevation, partial section view showing a fourth step of the method of using the first example bearing race remover/installer to remove a bearing race.

The anchor 30 is then arranged as shown in FIG. 7 to engage the hub 40 and thereby support the rod 32 and grip assembly 34 along a center axis A defined by the hub 40. The drive system 22 is also arranged to be supported by the anchor 30 such that the drive system 22 may exert a pulling force on the rod 32, placing the rod 32 in tension and, with sufficient pulling force, causing the grip assembly 34 to force the bearing race 24 out of the bearing race recess 64 as shown in FIG. 9. Further displacement of the grip assembly 34 completely removes the bearing race 24 from the hub 40 through the hub main opening 60.

By arranging the anchor 30 against the opposite end of the hub 40, reversing the direction of the rod 32, and providing an appropriately sized insertion cap 36, the first example bearing tool 20 may be used to force the bearing race 24 into the bearing race recess 64. As shown in FIGS. 23 and 24, bearing tool 20 is reversed with respect to the center axis A and with the insertion cap 36 engaging the bearing race inner surface 72 and first end surface 74 and operated to drive the bearing race 24 into place relative to the wheel 26.

With the foregoing general understanding of the construction and operation of the bearing tool 20 in mind, the details of the first example bearing tool 20 will now be described in further detail.

Referring initially to FIGS. 1 and 3, the example anchor 30 will first be described. The example anchor 30 comprises an anchor housing 120 and a plurality of anchor arms 122. A rod opening 124 is formed in the anchor housing 120. An arm gap 126 is formed between each of the anchor arms 122.

The example rod 32 defines a proximal end 130 and a distal end 132. The example proximal end 130 is threaded to allow the proximal end 130 to be secured to the grip assembly 34 as will be described in further detail below. The example distal end 132 of the rod 32 is similarly threaded to allow the rod to be connected to the drive system 22 such that the drive system 22 may apply an appropriate pulling force on the rod 32. The rod 32 is sized, dimensioned, and made of material capable of effectively transferring the pulling force generated by the drive system 22 to the grip assembly 34. The example rod 32 is made of steel.

FIG. 3 illustrates that the example grip assembly 34 comprises a draw plate 140, a split ring 142, a cap plate 144, and at least one draw bolt 146. The example grip assembly 34 comprises two of the draw bolts 146.

Figure 10:
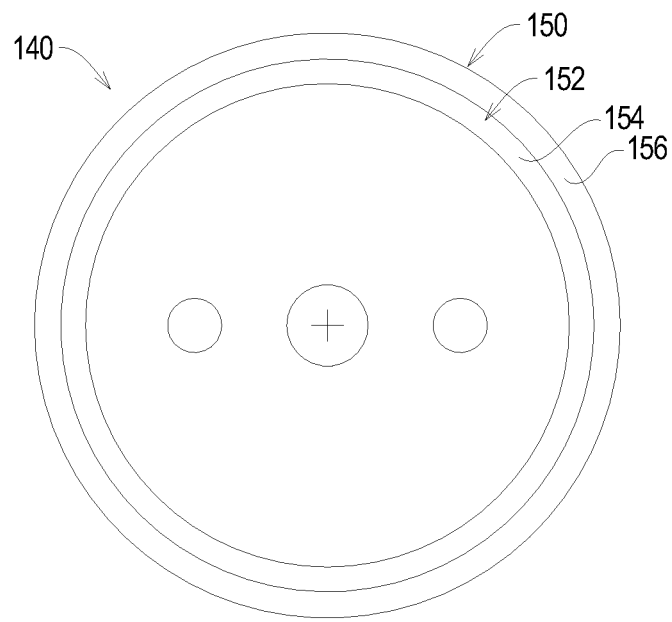
FIG. 10 is a top plan view of a draw plate of the gripping assembly of the first example bearing race remover/installer.
Figure 11:
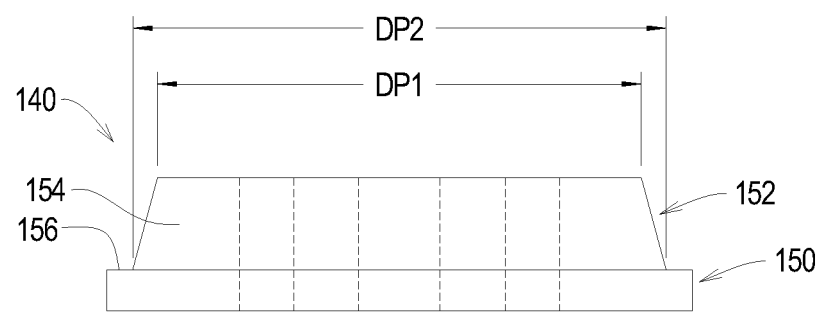
FIG. 11 is a side elevation view of the draw plate of the gripping assembly of the first example bearing race remover/installer.
Figure 12:
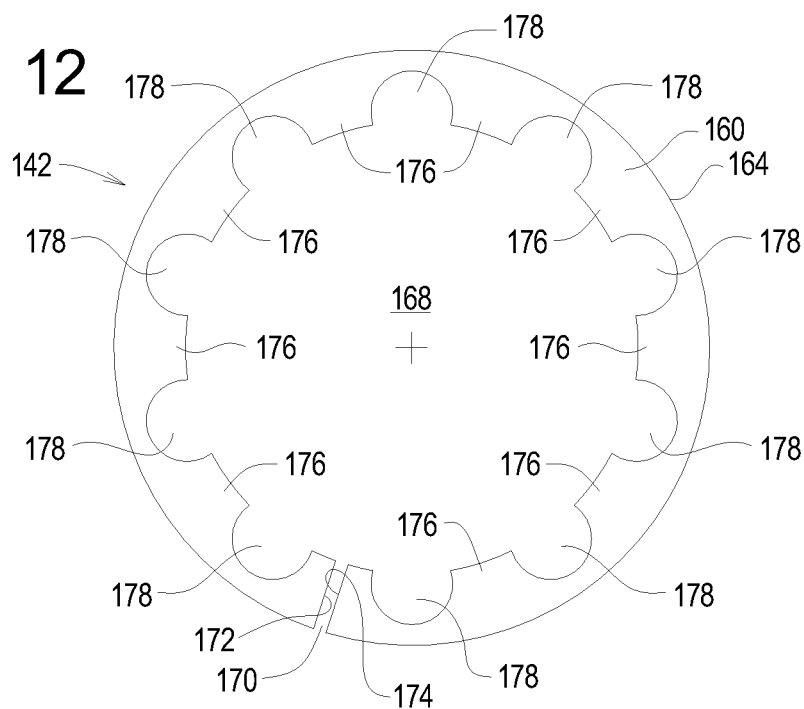
FIG. 12 is a top plan view of a split ring of the gripping assembly of the first example bearing race remover/installer.
Figure 13:
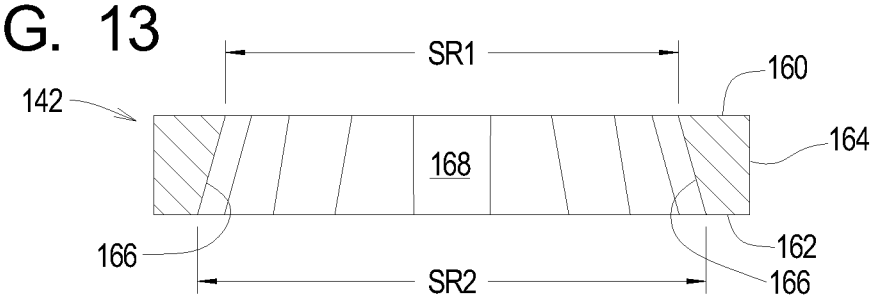
FIG. 13 is a side elevation section view of the split ring of the gripping assembly of the first example bearing race remover/installer.
Figure 14:
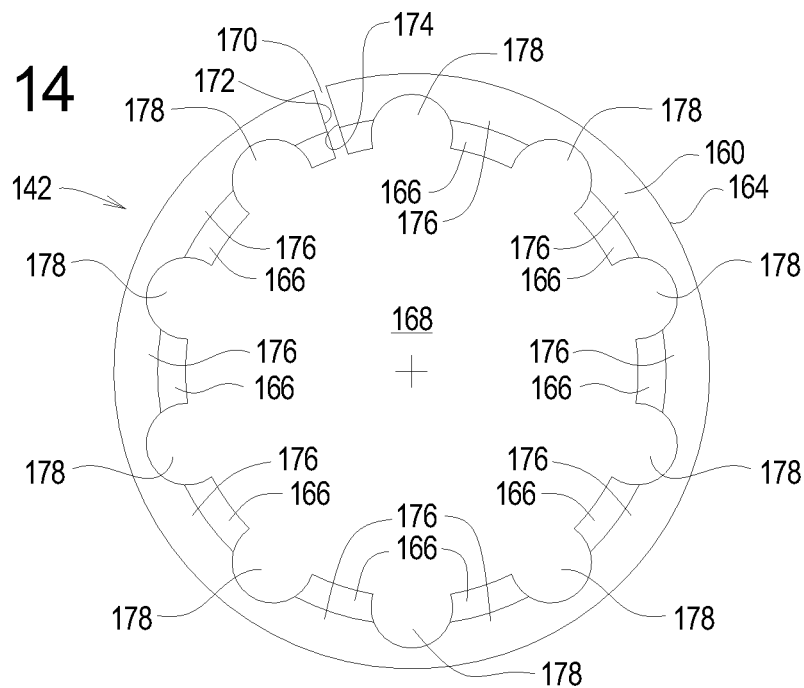
FIG. 14 is a bottom plan view of the split ring of the gripping assembly of the first example bearing race remover/installer.

As shown in FIGS. 3, 10, and 11, the example draw plate 140 comprises a draw plate perimeter portion 150 and a draw plate cam portion 152. The draw plate cam portion 152 defines a draw plate cam surface 154, and the draw plate perimeter portion 150 defines a draw plate stop surface 156. At least one threaded hole 158 is formed in the draw plate 140. The example draw plate 140 defines two of the threaded holes 158, one for each of the draw bolts 146 as will be described in further detail below. The example draw plate 140 further defines a threaded central hole 140a that engages the threaded proximal end 130 of the rod 32 to allow the rod 32 to be detachably attached to the example draw plate 140. The example draw plate 140 is generally symmetrical about an axis of rotation, and the proximal end 130 of the rod 32 is rigidly connected to the draw plate 140 such that the central hole 140a and the axis of rotation are aligned with a longitudinal axis B of the rod 32. The draw plate cam surface 154 is frustoconical in shape and defines a first diameter DP1 and a second diameter DP2 adjacent to the draw plate stop surface 156, where the second diameter DP2 is larger than the first diameter DP1.

The example split ring 142 will now be described in further detail with reference to FIGS. 3 and 12-14. The example split ring 142 defines a ring first surface 160, a ring second surface 162, a ring perimeter surface 164, and at least one ring cam surface 166. The example split ring 142 defines a split ring main opening 168 extending between the ring first surface 160 and the ring second surface 162. The at least one ring cam surface 166 at least partly faces the split ring main opening 168. The example split ring 142 further defines a ring gap 170 arranged between first and second gap surfaces 172 and 174. The example split ring 142 is a substantially flat disc made of spring steel that is capable of deforming such that an effective diameter of the ring perimeter surface 164 can be altered as will be described in further detail below. In the example split ring 142, a ring cam surface 166 is formed on each of a plurality of ring projections 176 formed between ring notches 178 such that a plurality of the ring cam surfaces 166 are employed. The example ring notches 178 reduce material at predetermined locations to facilitate deformation of the spring steel forming the split ring 142. Except for the ring gap 170, the example split ring 142 is substantially symmetrical about an axis of rotation. When the split ring 142 is in its un-deformed configuration, the split ring cam surfaces 166 follow a frustoconical shape defining a first diameter SR1 adjacent the split ring first surface 160 and a second diameter SR2 adjacent to the split ring second surface 162, where the second diameter SR2 is larger than the first diameter SR1.

Figure 15:
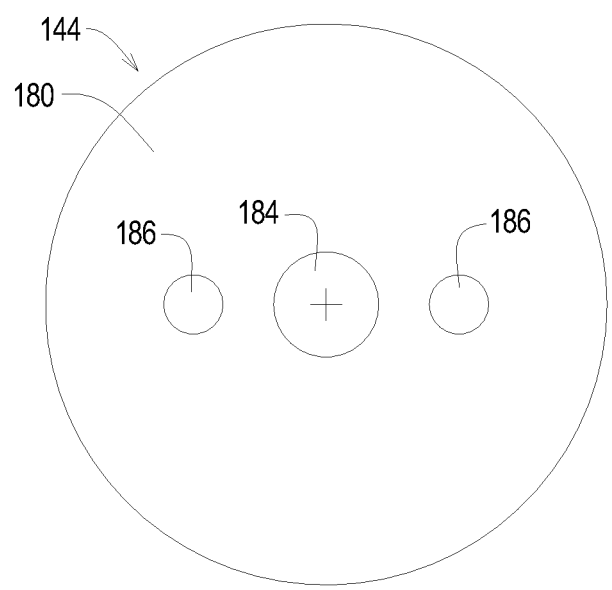
FIG. 15 is a top plan view of a cap plate of a gripping assembly of the first example bearing race remover/installer.
Figure 16:
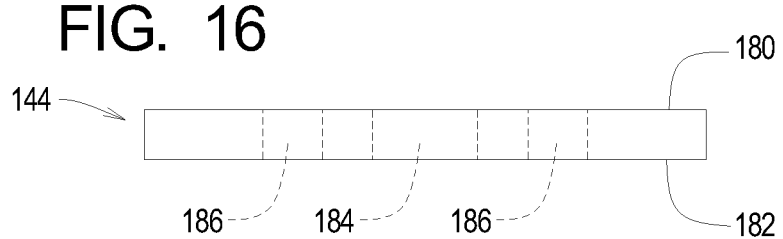
FIG. 16 is a side elevation view of the cap plate of the gripping assembly of the first example bearing race remover/installer.

FIGS. 3, 15, and 16 illustrate that the example cap plate 144 defines a cap plate first surface 180 and a cap plate second surface 182. A cap plate center hole 184 and at least one cap plate through hole 186 are formed in the example cap plate 144. The example cap plate 144 is substantially symmetrical about an axis of rotation. The example center cap plate through hole 184 is centered on the axis of rotation and is sized and dimensioned to receive the rod 32 as will be described in further detail below. The example cap plate 144 defines two of the cap through holes 186, one for each of the draw bolts 146 as will be described in further detail below. The threaded holes 158 of the example draw plate 140 are arranged to align with the cap through holes 186 during use of the first example bearing tool 20.

The draw bolts 146 are or may be conventional and comprise a bolt head 190 and a threaded shaft 192. The shaft diameter and thread pitch are configured to allow the draw bolts 146 to be threadingly received by the threaded holes 158 in the draw plate 140.

Figure 17:
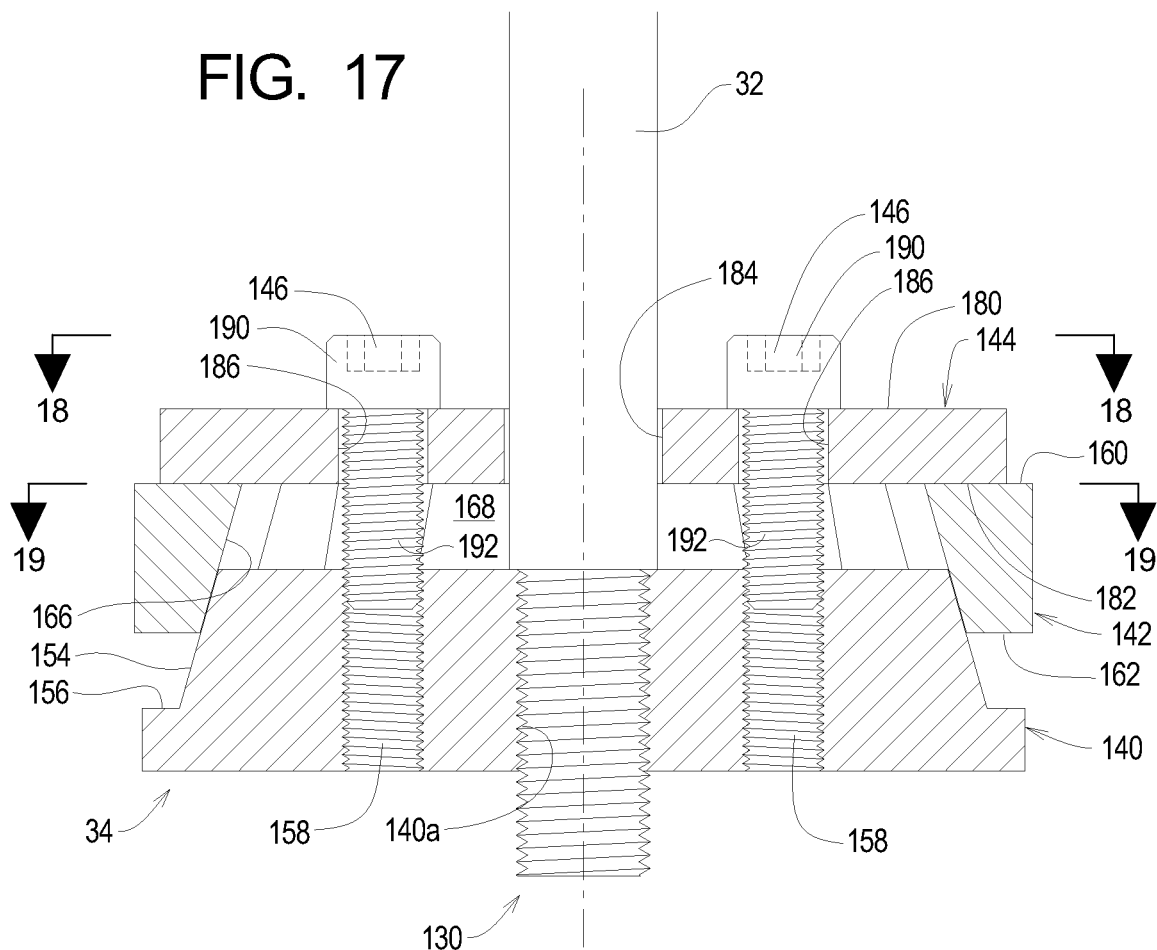
FIG. 17 is a side elevation, partial section view of the gripping assembly of the first example bearing race remover/installer in a retracted configuration.

The example grip assembly 34 is prepared for use by assembling the draw plate 140, split ring 142, cap plate 144, and draw bolts 146 as shown in FIG. 17. With the proximal end 130 of the rod 32 secured to the draw plate 140, the draw plate 140 is arranged such that the rod 32 is within the split ring main opening 168 and the split ring cam surfaces 166 face the draw plate cam surface 154. With the split ring 142 in an un-deformed configuration, the split ring 142 is displaced so that the split ring cam surfaces 166 engage the draw plate cam surface 154. The split ring second diameter SR2 is less than the draw plate second diameter DP2 and greater than the draw plate first diameter DP1 so the split ring cam surfaces 166 only partly overlap the draw plate cam surface 154 when the spilt ring 142 is not deformed (FIG. 17).

The cap plate 144 is then arranged such that the rod 32 extends through the cap plate center hole 184 and the cap plate second surface 182 is in contact with the split ring first surface 160. The cap plate 144 is then rotated such that the cap plate through holes 186 are aligned with the draw plate threaded holes 158. The threaded shafts 192 of the draw bolts 146 are then inserted through the cap plate through holes 186 and threaded into the draw plate threaded holes 158 until the bolt heads 190 engage the cap plate first surface 180.

Figure 18:
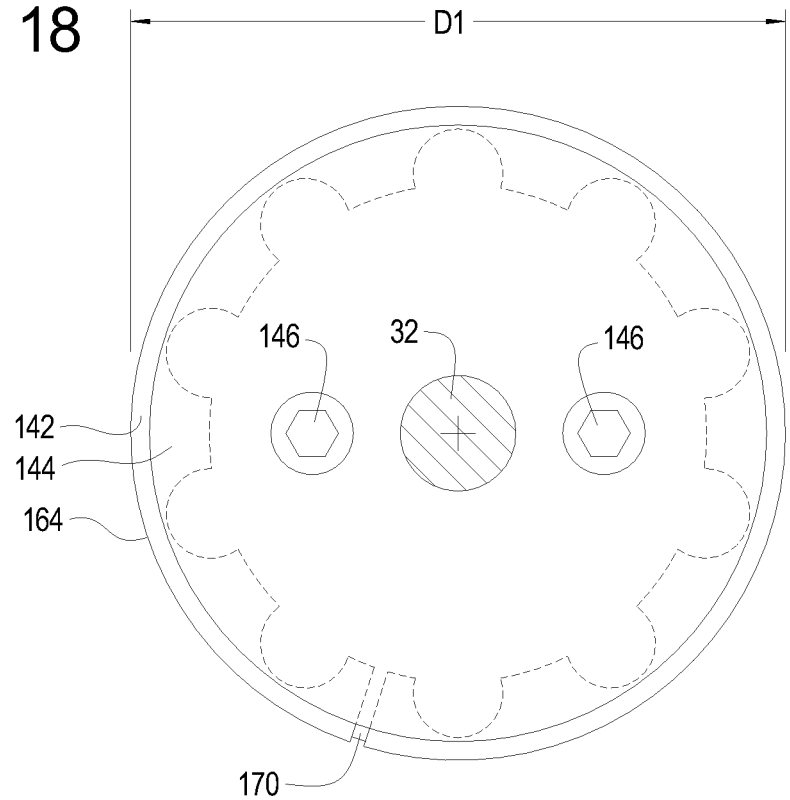
FIG. 18 is a section view taken along lines 18-18 in FIG. 17.
Figure 19:
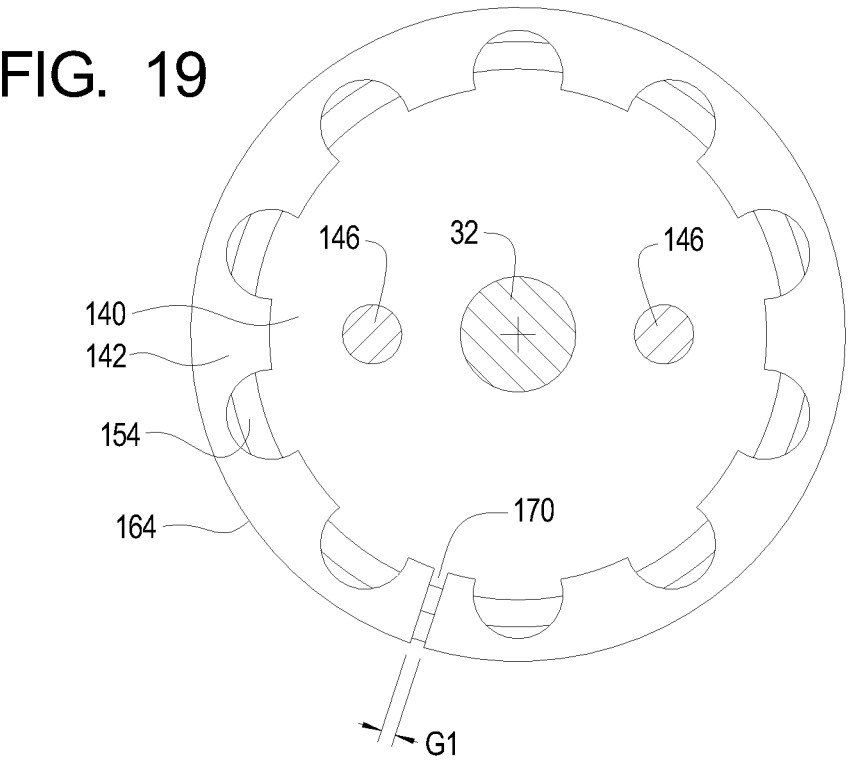
FIG. 19 is a section view taken along lines 19-19 in FIG. 17.

When initially prepared for use as shown in FIG. 17, the draw bolts 146 are tightened sufficiently to prevent the draw plate cam surface 154 from exerting an outward force on the split ring cam surfaces 166 and deforming the split ring 142. When the split ring 142 is un-deformed, the ring gap 170 defines a first gap dimension G1, and split ring perimeter surface 164 defines a first split ring effective diameter D1 as shown in FIGS. 18 and 19. The first effective diameter D1 is substantially equal to the diameter of the split ring perimeter surface 164 when the split ring 142 is un-deformed. The example grip assembly 34 is in the retracted configuration when the split ring 142 is un-deformed as shown in FIGS. 17-19.

With the example grip assembly 34 prepared for use as described above, the example grip assembly 34 is then connected to the drive system 22 as follows. The example drive system 22 defines a housing 220 and an actuator assembly 222. The actuator assembly 222 comprises an actuator cylinder 230 and an actuator shaft 232. The actuator cylinder 230 and shaft 232 are supported by the housing 220. The actuator cylinder 230 and shaft 232 further define an actuator passageway 234. As shown in FIGS. 7 and 9, the drive system 22 is arranged such that the rod extends through the actuator passageway 234. A drive plate 240 is placed over the distal end 132 of the rod 32, and a drive nut 242 is threaded onto the rod distal end 132 such that movement of the shaft 232 relative to the housing 220 is transmitted to the rod distal end 132 through the drive plate 240 and drive nut 242. As shown by a comparison of FIGS. 7 and 9, operation of the drive system 22 causes the drive shaft 232 to extend out of the housing 220, and the housing 220 is supported such that the rod 32 is displaced along the center axis A.

Figure 20:
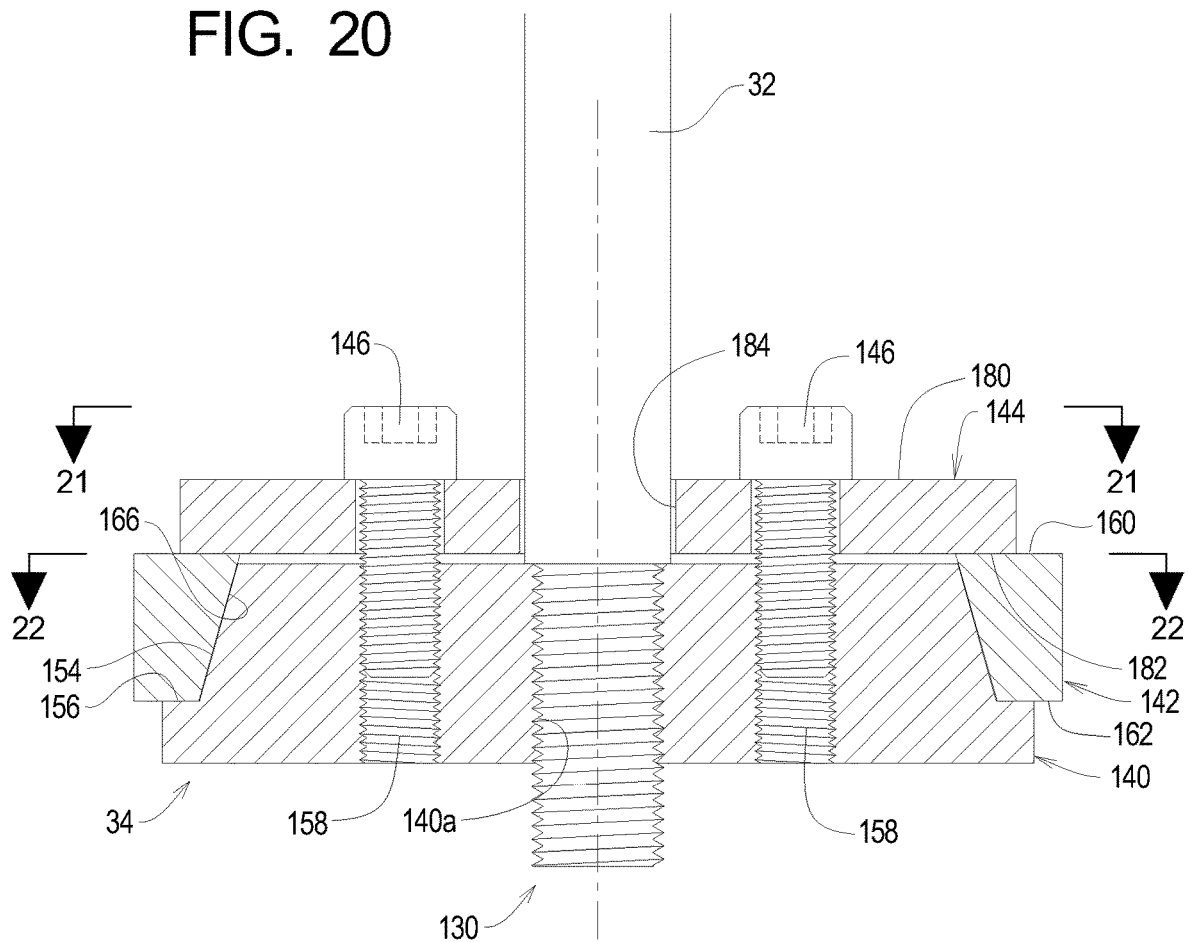
FIG. 20 is a side elevation, partial section view of the gripping assembly of the first example bearing race remover/installer in an expanded configuration.
Figure 21:
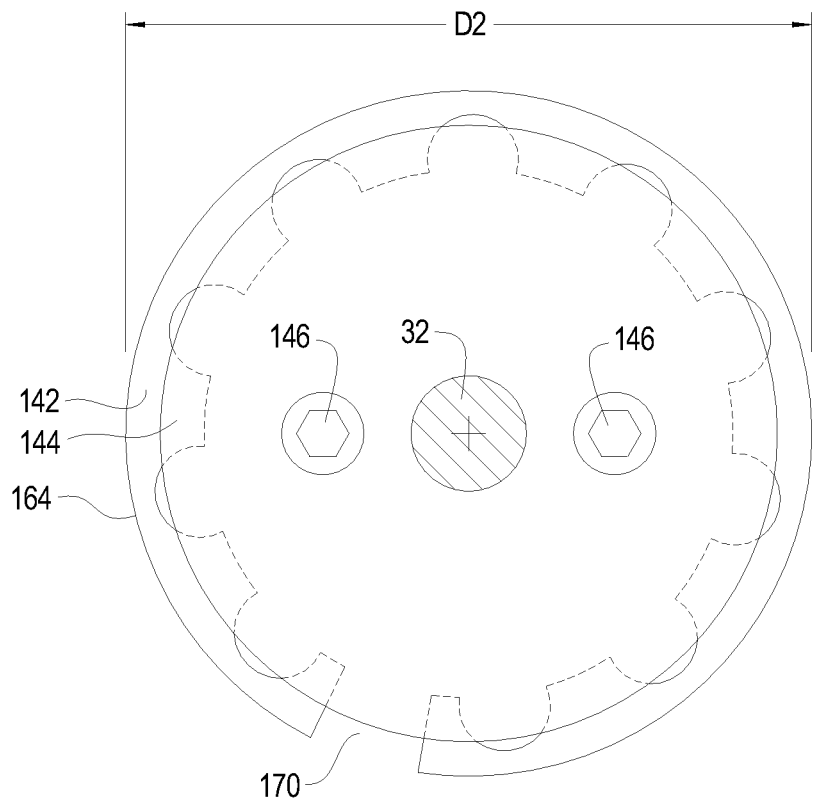
FIG. 21 is a section view taken along lines 21-21 in FIG. 20.
Figure 22:
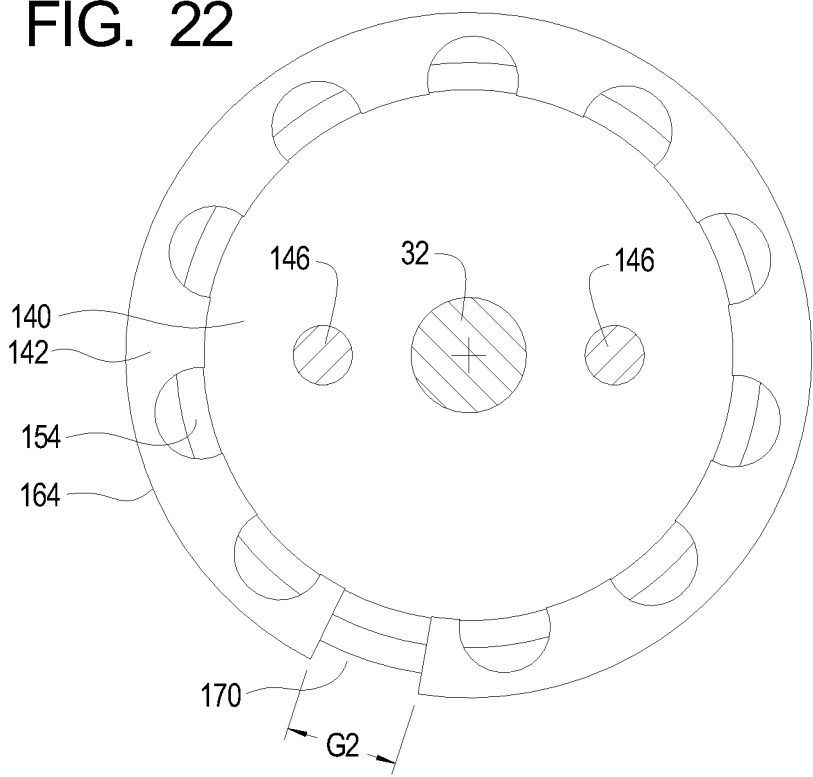
FIG. 22 is a section view taken along lines 22-22 in FIG. 20.

Further rotation of the draw bolts 146 pulls the draw plate 140 and the cap plate 144 towards each other. As the draw plate 140 and the cap plate 144 move towards each other, the draw plate cam surface 154 acts on the split ring cam surfaces 166 to deform the split ring 142. As the split ring 142 deforms, the ring gap 170 and the effective diameter of the split ring 142 as defined by the split ring perimeter surface 164 increases. When the split ring second surface 162 engages the draw plate stop surface 156 as shown in FIG. 20, the ring gap 170 defines a second gap dimension G2, and the split ring perimeter surface 164 defines a second split ring effective diameter D2 as shown in FIGS. 21 and 22. The example grip assembly 34 is in the expanded configuration when the split ring 142 is deformed as shown in FIGS. 20-22.

At this point, operation of the actuator assembly 222 displaces the rod 32, the grip assembly 34, and thus the bearing race 24 such that the bearing race 24 is removed from the wheel 26 as shown in FIG. 9.

FIG. 23 shows that the example insertion cap 36 defines a leading surface 320, a trailing surface 322, an annular surface 324, an inner surface 326, and a drive surface 328. A threaded center hole 330 is formed along the axis of symmetry of the insertion cap 36. The example annular surface 324 defines a larger diameter than that of the leading surface 320 such that the drive surface 328 is formed between the annular surface 324 and the frustoconical surface 326 at an angle orthogonal to the axis of symmetry of the insertion cap 36.

Typically, a plurality of the insertion caps 36 will be provided each of a different size and shape to match a particular size and configuration of bearing race. In particular, as shown in FIGS. 23 and 24, the example insertion cap 36 depicted therein is sized and configured such that the insertion plate inner surface 326 engages the bearing race inner surface 72 and the insertion plate drive surface 328 engages the bearing race first end surface 74.

In use, the insertion cap 36 is detachably attached to the proximal end 130 of the rod 32 by threading the proximal end 130 into the center hole 330. When arranged as shown in FIG. 23 (reversed from FIGS. 7 and 9), operation of the actuator assembly 222 drives the bearing race 24 along the center axis A into proper position relative to the wheel 26 as shown in FIG. 24.

The example drive system 22 may be hydraulically powered by a pump system or manual jack system or may use a screw jack or other means for displacing a shaft relative to a housing.

Figure 25:
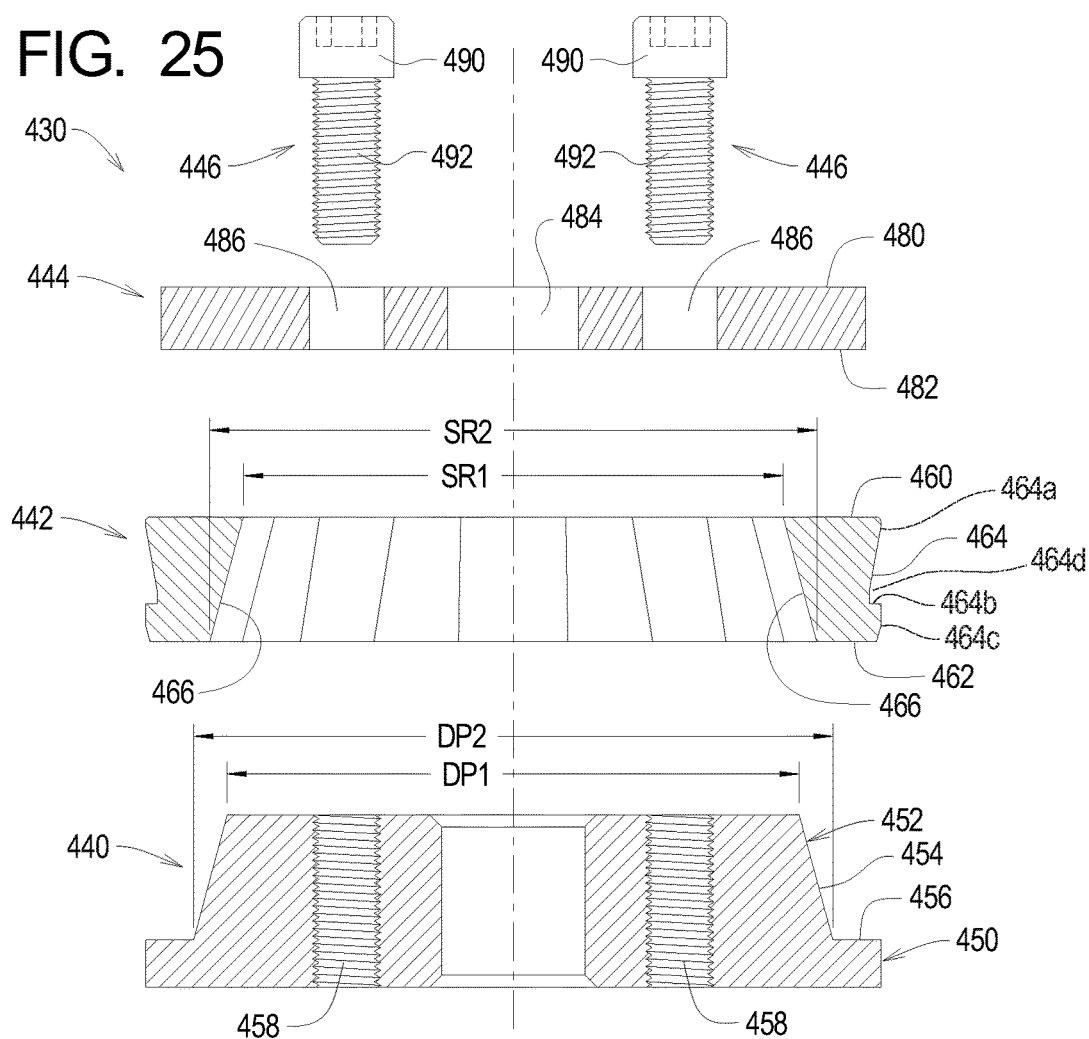
FIG. 25 is a side elevation, partly exploded view of a portion of the second example bearing race remover/installer.
Figure 26:
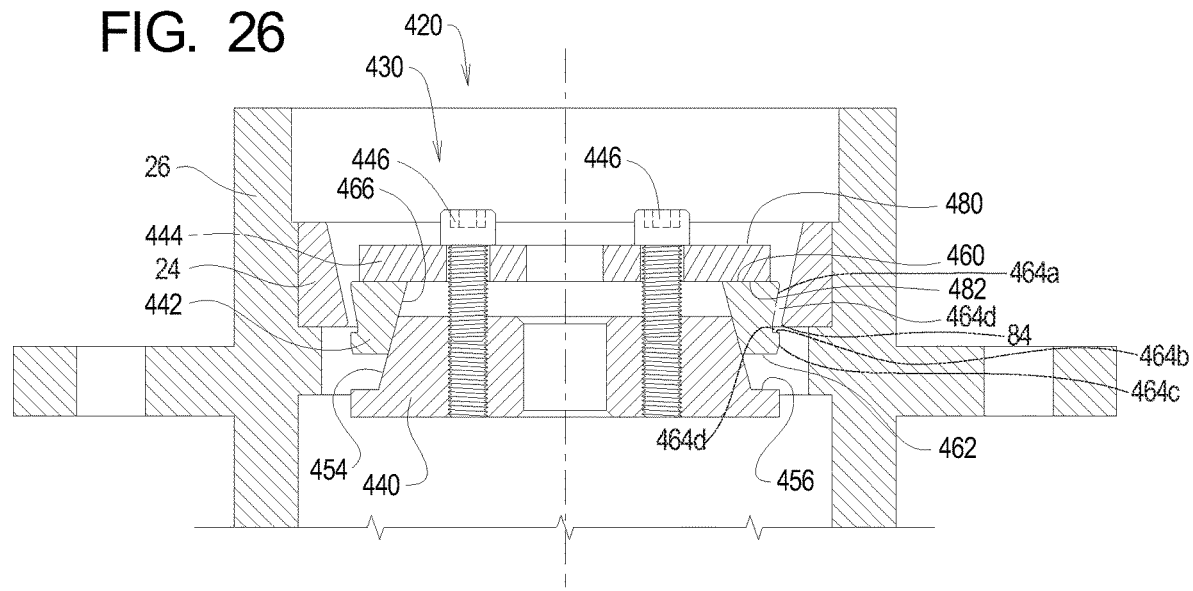
FIG. 26 is a side elevation, partial section view showing a first step of a method of using the second example bearing race remover/installer to remove a bearing race.
Figure 27:
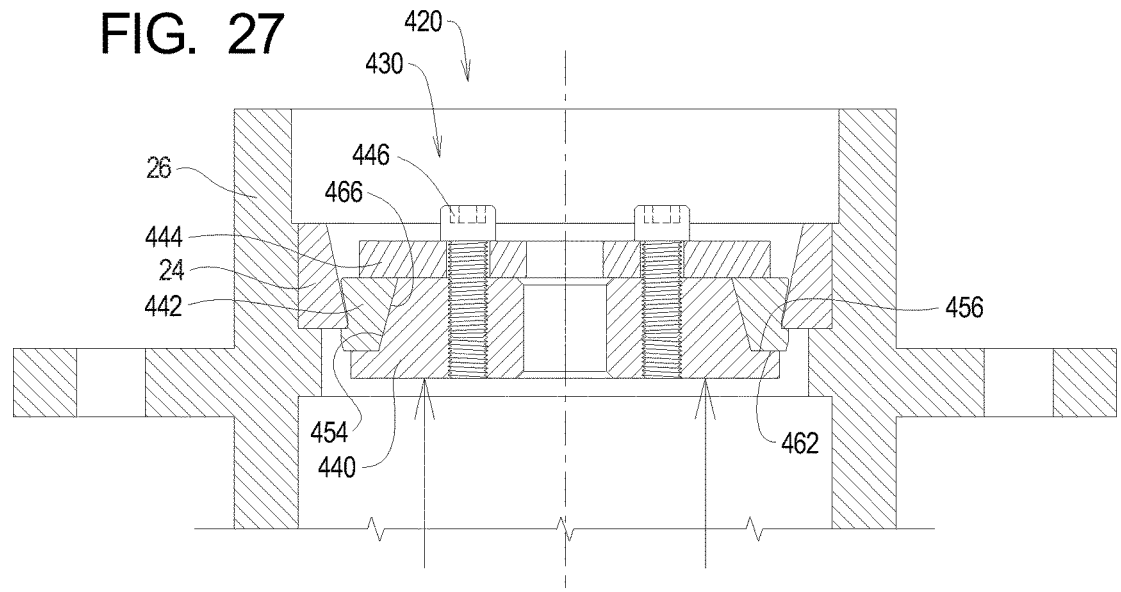
FIG. 27 is a side elevation, partial section view showing a second step of the method of using the second example bearing race remover/installer to remove a bearing race.
Figure 28:
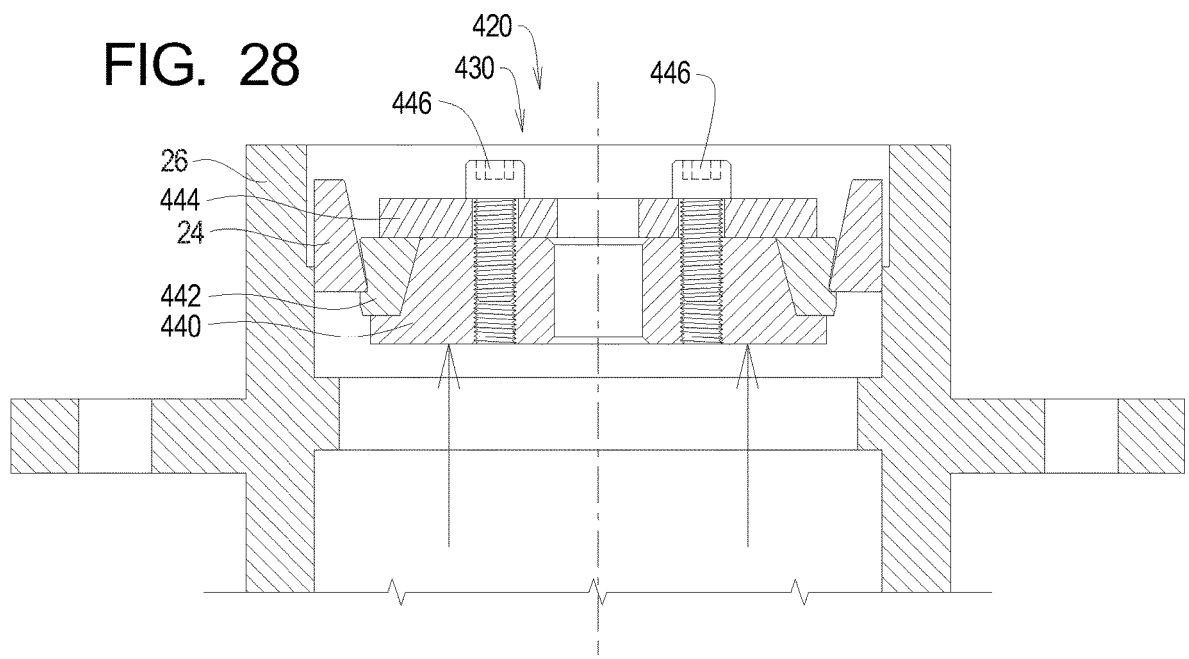
FIG. 28 is a side elevation, partial section view showing a third step of the method of using the second example bearing race remover/installer to remove a bearing race.

Referring now to FIGS. 25-28 of the drawing, depicted therein is a second example bearing race installer/remover (bearing tool) 420 constructed in accordance with, and embodying, the principles of the present invention. As shown in FIGS. 26-28, the example bearing tool 420 may be used without a drive system or anchor to remove the bearing race 24 from the wheel 26. The second example bearing tool 420 includes a grip assembly 430 similar to the grip assembly 34 described above.

In particular, FIGS. 25 and 26 illustrate that the example grip assembly 430 comprises a draw plate 440, a split ring 442, a cap plate 444, and at least one draw bolt 446. The example grip assembly 430 comprises two of the draw bolts 446.

As shown in FIG. 25, the example draw plate 440 comprises a draw plate perimeter portion 450 and a draw plate cam portion 452. The draw plate cam portion 452 defines a draw plate cam surface 454, and the draw plate perimeter portion 450 defines a draw plate stop surface 456.

At least one threaded hole 458 is formed in the draw plate 440. The example draw plate 440 defines two of the threaded holes 458, one for each of the draw bolts 446 as will be described in further detail below. The example draw plate 440 is generally symmetrical about an axis of rotation. The draw plate cam surface 454 is frustoconical in shape and defines a first diameter DP1 and a second diameter DP2 adjacent to the draw plate stop surface 456, where the second diameter DP2 is larger than the first diameter DP1.

Figure 25A:
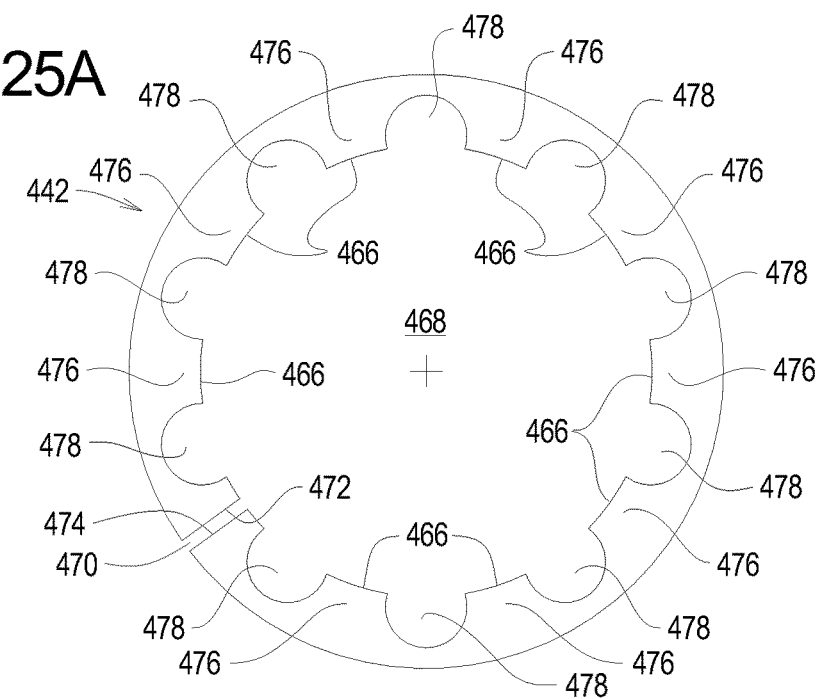
FIG. 25A is a top plan view of a split ring of the gripping assembly of the second example bearing race remover/installer.

The example split ring 442 will now be described in further detail with reference to FIGS. 25 and 25a. The example split ring 442 defines a ring first surface 460, a ring second surface 462, a ring perimeter surface 464, and at least one ring cam surface 466. The example split ring 442 defines a split ring main opening 468 extending between the ring first surface 460 and the ring second surface 462. The at least one ring cam surface 466 at least partly faces the split ring main opening 468. The example split ring 442 further defines a ring gap 470 arranged between first and second gap surfaces 472 and 474.

The example split ring 442 is a substantially flat disc made of spring steel that is capable of deforming such that an effective diameter of the ring perimeter surface 464 can be altered as will be described in further detail below. The example split ring 442 is further configured such that the example ring perimeter surface 464 defines a first portion 464a, a second portion 464b, and a third portion 464c. In the example split ring 442, the second portion 464b is angled with respect the longitudinal axis of the grip assembly 430 and defines a notch 464d. In particular, the example first portion 464a of the ring perimeter surface 464 extends at an angle of less than 90° relative to the longitudinal axis of the grip assembly 430, and the example second portion 464b is substantially perpendicular to the longitudinal axis of the grip assembly 430.

In the example split ring 442, a ring cam surface 466 is formed on each of a plurality of ring projections 476 formed between ring notches 478 such that a plurality of the ring cam surfaces 466 are employed. The example ring notches 478 reduce material at predetermined locations to facilitate deformation of the spring steel forming the split ring 442. Except for the ring gap 470, the example split ring 442 is substantially symmetrical about an axis of rotation. When the split ring 442 is in its un-deformed configuration, the split ring cam surfaces 466 follow a frustoconical shape defining a first diameter SR1 adjacent the split ring first surface 460 and a second diameter SR2 adjacent to the split ring second surface 462, where the second diameter SR2 is larger than the first diameter SR1.

FIG. 25 illustrates that the example cap plate 444 defines a cap plate first surface 480 and a cap plate second surface 482. A cap plate center hole 484 and at least one cap plate through hole 486 are formed in the example cap plate 444. The example cap plate 444 is substantially symmetrical about an axis of rotation. The example center cap plate through hole 484 is centered on the axis of rotation. The example cap plate 444 defines two of the cap through holes 486, one for each of the draw bolts 446 as will be described in further detail below. The threaded holes 458 of the example draw plate 440 are arranged to align with the cap through holes 486 during use of the second example bearing tool 420.

The draw bolts 446 are or may be conventional and comprise a bolt head 490 and a threaded shaft 492. The shaft diameter and thread pitch are configured to allow the draw bolts 446 to be threadingly received by the threaded holes 458 in the draw plate 440.

The example grip assembly 430 is prepared for use by assembling the draw plate 440, split ring 442, cap plate 444, and draw bolts 446 as shown in FIG. 26. With the split ring 442 in an un-deformed configuration, the split ring 442 is displaced so that the split ring cam surfaces 466 engage the draw plate cam surface 454. The split ring second diameter SR2 is less than the draw plate second diameter DP2 and greater than the draw plate first diameter DP1 so the split ring cam surfaces 466 only partly overlap the draw plate cam surface 454 when the spilt ring 442 is not deformed (FIG. 26).

The cap plate 444 is then arranged such that the cap plate second surface 482 is in contact with the split ring first surface 460. The cap plate 444 is then rotated such that the cap plate through holes 486 are aligned with the draw plate threaded holes 458. The threaded shafts 492 of the draw bolts 446 are then inserted through the cap plate through holes 486 and threaded into the draw plate threaded holes 458 until the bolt heads 490 engage the cap plate first surface 480.

When initially prepared for use as shown in FIG. 26, the draw bolts 446 are tightened sufficiently to prevent the draw plate cam surface 454 from exerting an outward force on the split ring cam surfaces 466 and deforming the split ring 442. When the split ring 442 is un-deformed, the ring gap 470 defines a first gap dimension and split ring perimeter surface 464 defines a first split ring effective diameter as shown by a comparison of FIGS. 25A and 26 with FIG. 27. The first effective diameter is substantially equal to the diameter of the split ring perimeter surface 464 when the split ring 442 is un-deformed. The example grip assembly 430 is in the retracted configuration when the split ring 442 is un-deformed.

Figure 29:
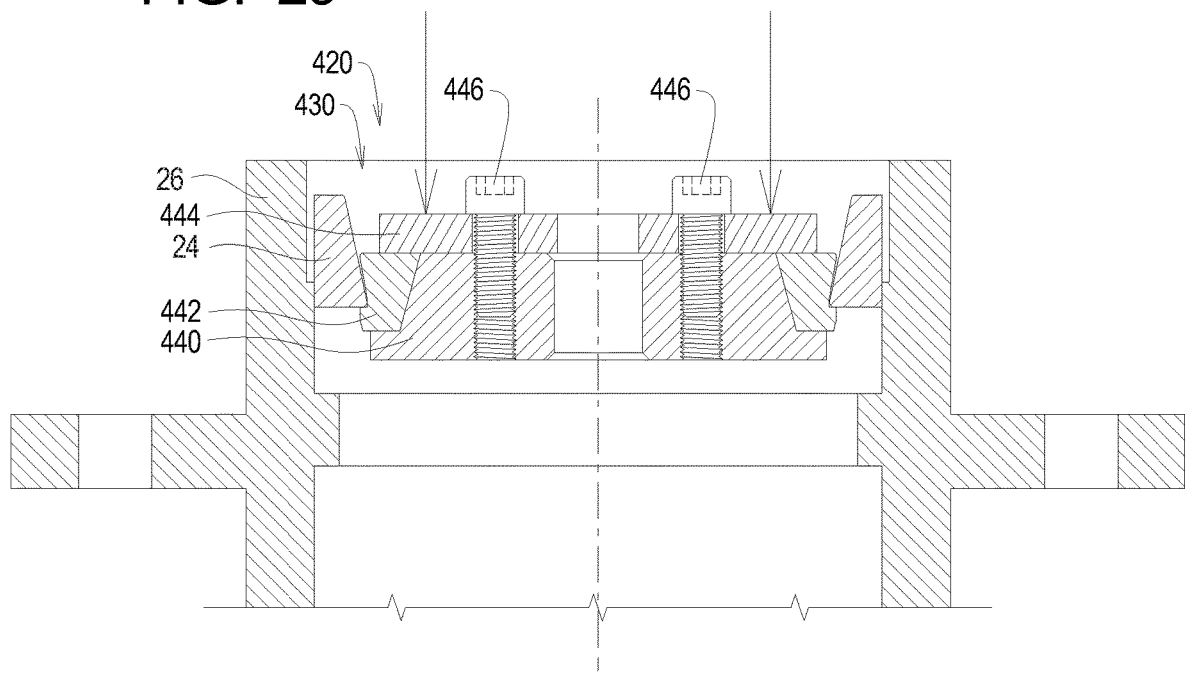
FIG. 29 is a side elevation, partial section view showing the second example bearing race remover/installer being used to install a bearing race.

With the example grip assembly 430 prepared for use as described above, further rotation of the draw bolts 446 pulls the draw plate 440 and the cap plate 444 towards each other. As the draw plate 440 and the cap plate 444 move towards each other, the draw plate cam surface 454 acts on the split ring cam surfaces 466 to deform the split ring 442. As the split ring 442 deforms, the ring gap 470 and the effective diameter of the split ring 442 as defined by the split ring perimeter surface 464 increases. When the split ring second surface 462 engages the draw plate stop surface 456 as shown in FIGS. 27-29, the ring gap 470 defines a second gap dimension, and the split ring perimeter surface 464 defines a second split ring effective diameter as shown in FIGS. 27-29. The example grip assembly 430 is in the expanded configuration when the split ring 442 is deformed as shown in FIGS. 27-29.

The example split ring perimeter surface 464 is configured to catch the bearing race edge 84 when the split ring 442 is expanded. In particular, the notch 464d defined by the split ring perimeter surface 464 is sized and dimensioned to receive the bearing race edge 84.

At this point, the example grip assembly 430 is displaced as shown by arrows in FIG. 27 to displace the bearing race 24 relative to the wheel 26 such that the bearing race 24 is removed from the wheel 26 as shown in FIG. 28. More specifically, the grip assembly 430 may be driven by a press or pounded using a hammer while the wheel 26 is supported such that the bearing race 24 is displaced relative to the wheel 26. If a hammer is used, a sacrificial intermediate member (not shown) such as a block of soft steel or wood may be used transfer the hammer blows to the grip assembly 430.

FIG. 29 illustrates that the example grip assembly 430 may also be displaced as shown by arrows in FIG. 29 to displace the bearing race 24 relative to the wheel 26 such that the bearing race 24 is installed into the wheel 26. More specifically, the grip assembly 430 may be driven by a press or pounded using a hammer to displace the bearing race 24 relative to the wheel 26. Again, if a hammer is used, a sacrificial intermediate member (not shown) such as a block of soft steel or wood may be used transfer the hammer blows to the grip assembly 430.

What is claimed is:

1. A puller or installer tool for a bearing race comprising:
    a draw plate defining a draw plate cam surface, a draw plate threaded central hole, and at least one threaded draw plate bolt hole;
    a split ring defining at least one split plate cam surface, a split ring central opening, and a ring gap;
    a cap plate defining a cap plate center hole and at least one cap plate bolt through hole;
    at least one bolt member adapted to extend through the at least one cap plate bolt through hole and to engage the at least one threaded draw plate bolt hole; and
    at least one rod defining a threaded end adapted to engage the draw plate threaded central hole; wherein
    with the split ring arranged between the draw plate and the cap plate, the at least one bolt member is arranged to extend through the at least one cap plate bolt through hole, to extend through the split ring central opening, and to engage the at least one threaded draw plate bolt hole;
    the at least one rod is arranged to extend through the cap plate center hole and the split ring central opening such that
        the threaded end of the at least one rod engages the draw plate threaded central hole, and
        the split ring is arranged such that the at least one split plate cam surface is in contact with the draw plate cam surface;
    rotation of the at least one bolt member displaces the draw plate relative to the cap plate such that the draw plate cam surface engages the at least one split plate cam surface to deform the split ring to alter an effective diameter of the puller or installer tool by altering dimensions of the ring gap such that the split ring engages the bearing race; and
    displacement of the rod displaces the split ring to displace the bearing race.

2. The puller or installer tool as recited in claim 1, in which the split ring defines a surface configured to engage a portion of the bearing race.

3. The puller or installer tool as recited in claim 1, in which the split ring defines a notch configured to engage a portion of the bearing race.

4. The puller or installer tool as recited in claim 1, further comprising:
    an anchor; wherein
    the rod is supported for movement relative to the anchor; and
    displacement of the rod relative to the anchor displaces the draw plate relative to the anchor.

5. The puller or installer tool as recited in claim 1, further comprising:
    an anchor, where the rod is supported for movement relative to the anchor;
    and
    a drive system for displacing the rod relative to the anchor; wherein operation of the drive system displaces the rod relative to the anchor to displace the draw plate relative to the anchor.

6. A tool assembly for installing a bearing race into or removing the bearing race from a wheel, the tool assembly comprising:
- a draw plate defining a draw plate cam surface, a draw plate threaded central hole, and at least one threaded draw plate bolt hole;
- a split ring defining at least one split plate cam surface, a split ring central opening, and a ring gap;
- a cap plate defining a cap plate center hole and at least one cap plate bolt through hole;
- at least one bolt member adapted to extend through the at least one cap plate bolt through hole and to engage the at least one threaded draw plate bolt hole; and
- at least one rod defining a threaded end adapted to engage the draw plate threaded central hole; wherein
- with the split ring arranged between the draw plate and the cap plate, the at least one bolt member is arranged to extend through the at least one cap plate bolt through hole, to extend through the split ring central opening, and to engage the at least one threaded draw plate bolt hole;
- the at least one rod is arranged to extend through the cap plate center hole and the split ring central opening such that
  - the threaded end of the at least one rod engages the draw plate threaded central hole, and
  - the split ring is arranged such that the at least one split plate cam surface is in contact with the draw plate cam surface;
- rotation of the at least one bolt member displaces the draw plate relative to the cap plate such that the draw plate cam surface engages the at least one split plate cam surface to deform the split ring to alter an effective diameter of the tool assembly by altering dimensions of the ring gap;
- the split ring is sized and dimensioned to engage a portion of the bearing race when the split ring is deformed; and
- displacement of the rod displaces the split ring to displace the bearing race.

7. The tool assembly as recited in claim 6, in which the split ring defines surface a surface configured to engage a portion of the bearing race.

8. The tool assembly as recited in claim 6, in which the split ring defines a notch configured to engage a portion of the bearing race.

9. The tool assembly as recited in claim 6, further comprising:
- an anchor adapted to engage the wheel;
- the rod is supported for movement relative to the anchor; wherein
- displacement of the rod relative to the anchor displaces the draw plate relative to the anchor.

10. The tool assembly as recited in claim 6, further comprising:
- an anchor adapted to engage the wheel, where the rod supported for movement relative to the anchor; and
- a drive system for displacing the rod relative to the anchor; wherein
- operation of the drive system displaces the rod relative to the anchor to displace the draw plate relative to the anchor.

* * * * *